US010855712B2

(12) United States Patent
Oliner et al.

(10) Patent No.: US 10,855,712 B2
(45) Date of Patent: *Dec. 1, 2020

(54) DETECTION OF ANOMALIES IN A TIME SERIES USING VALUES OF A DIFFERENT TIME SERIES

(71) Applicant: SPLUNK INC., San Francisco, CA (US)

(72) Inventors: Adam Jamison Oliner, San Francisco, CA (US); Jonathan La, San Francisco, CA (US); Colleen Kinross, San Francisco, CA (US); Hongyang Zhang, Vancouver (CA); Jacob Leverich, San Francisco, CA (US); Shang Cai, San Francisco, CA (US); Mihai Ganea, San Francisco, CA (US); Alex Cruise, San Francisco, CA (US); Toufic Boubez, Vancouver (CA); Manish Sainani, Kirkland, WA (US)

(73) Assignee: SPLUNK Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/446,300

(22) Filed: Jun. 19, 2019

(65) Prior Publication Data

US 2019/0306184 A1    Oct. 3, 2019

Related U.S. Application Data

(63) Continuation of application No. 15/420,737, filed on Jan. 31, 2017, now Pat. No. 10,375,098.

(51) Int. Cl.
*G06F 21/00* (2013.01)
*H04L 29/06* (2006.01)
(Continued)

(52) U.S. Cl.
CPC .......... *H04L 63/1425* (2013.01); *G06N 3/04* (2013.01); *G06N 3/08* (2013.01); *G06N 5/003* (2013.01)

(58) Field of Classification Search
None
See application file for complete search history.

(56) References Cited

U.S. PATENT DOCUMENTS

2007/0192863 A1* 8/2007 Kapoor ............... H04L 67/10
726/23
2010/0057662 A1* 3/2010 Collier ............... G06N 7/005
706/52
(Continued)

OTHER PUBLICATIONS

Computer Desktop Encyclopedia definition of "processor": http://lookup.computerlanguage.com/host_app/search?cid=C999999&term=processor&lookup.x=0&lookup.y=0 (Year: 2014).*

(Continued)

*Primary Examiner* — Jeremiah L Avery
(74) *Attorney, Agent, or Firm* — Shook, Hardy & Bacon L.L.P.

(57) ABSTRACT

In some implementations, sequences of time series values determined from machine data are obtained. Each sequence corresponds to a respective time series. A plurality of predictive models is generated for a first time series from the sequences of time series values. Each predictive model is to generate predicted values associated with the first time series using values of a second time series. For each of the plurality of predictive models, an error is determined between the corresponding predicted values and values associated with the first time series. A predictive model is selected for anomaly detection based on the determined error of the predictive model. Transmission is caused of an indication of an anomaly detected using the selected predictive model.

30 Claims, 22 Drawing Sheets

(51) Int. Cl.
  *G06N 3/08* (2006.01)
  *G06N 5/00* (2006.01)
  *G06N 3/04* (2006.01)

(56) References Cited

U.S. PATENT DOCUMENTS

| | | | | |
|---|---|---|---|---|
| 2011/0126111 | A1* | 5/2011 | Gill | G06F 21/577 715/736 |
| 2011/0185421 | A1* | 7/2011 | Wittenstein | H04L 63/1416 726/22 |
| 2011/0185422 | A1* | 7/2011 | Khayam | H04L 63/1425 726/23 |
| 2011/0214187 | A1* | 9/2011 | Wittenstein | H04L 61/301 726/25 |
| 2011/0267964 | A1* | 11/2011 | Baltatu | H04L 43/00 370/242 |
| 2015/0163242 | A1* | 6/2015 | Laidlaw | G06N 7/023 726/22 |
| 2015/0229661 | A1* | 8/2015 | Balabine | H04L 63/1416 726/22 |
| 2015/0234869 | A1* | 8/2015 | Chan | G06F 11/0751 707/603 |
| 2015/0235152 | A1* | 8/2015 | Eldardiry | H04L 63/1425 705/7.28 |
| 2016/0028758 | A1* | 1/2016 | Ellis | H04L 63/1433 726/25 |
| 2016/0330225 | A1* | 11/2016 | Kroyzer | G06N 20/00 |

OTHER PUBLICATIONS

Solaimani, Mohiuddin et al. Statistical Technique for Online Anomaly Detection Using Spark Over Heterogeneous Data from Multi-source VMware Performance Data. 2014 IEEE International Conference on Big Data. https://ieeexplore.ieee.org/stamp/stamp.jsp?tp=&arnumber=7004343 (Year: 2014).*

Lavin, Alexander; Ahmad, Subutai. Evaluating Real-time Anomaly DetectionAlgorithms—the Numenta Anomaly Benchmark. 2015 IEEE 14th International Conference on Machine Learning and Applications. https://ieeexplore.ieee.org/stamp/stamp.jsp?tp=&arnumber=7424283 (Year: 2015).*

Qin, Deyuan et al. Virtual machine anomaly detection based on partitioning detection domain. 2016 7th IEEE International Conference on Software Engineering and Service Science (ICSESS). https://ieeexplore.ieee.org/stamp/stamp.jsp?tp=&arnumber=7883102 (Year: 2016).*

Rana, Annie Ibrahim et al. Anomaly Detection Guidelines for Data Streams in Big Data. 2016 3rd International Conference on Soft Computing & Machine Intelligence (ISCMI). https://ieeexplore.ieee.org/stamp/stamp.jsp?tp=&arnumber=8057446 (Year: 2016).*

Kittler, Josef et al. Domain Anomaly Detection in Machine Perception: A System Architecture and Taxonomy. IEEE Transactions on Pattern Analysis and Machine Intelligence, vol. 36, Issue: 5. https://ieeexplore.ieee.org/stamp/stamp.jsp?tp=&arnumber=6636290 (Year: 2014).*

Margineantu, Dragos et al. Data Mining Methods for Anomaly Detection KDD-2005 Workshop Report. ACM SIGKDD Explorations Newsletter, vol. 7, Issue: 2. https://dl.acm.org/citation.cfm?id=1117473 (Year: 2005).

Baah, George K. et al. On-line Anomaly Detection of Deployed Software: A Statistical Machine Learning Approach. Proceedings of the 3rd International Workshop on Software Quality Assurance, SOQUA '06. https://dl.acm.org/citation.cfm?id=1188911 (Year: 2006).

Gunnemann, Stephan et al. Detecting Anomalies in Dynamic Rating Data: A Robust Probabilistic Model for Rating Evolution. Proceedings of the 20th ACM SIGKDD International Conference on Knowledge Discovery and Data Mining. https://dl.acm.org/citation.cfm?id=2623721 (Year: 2014).

Computer Desktop Encyclopedia definition of "processor": http://lookup.computerlanguage.com/host_app/search?cid=C999999&term=processor&lookup.x=O&lookup.y=0 (Year: 2014).

* cited by examiner

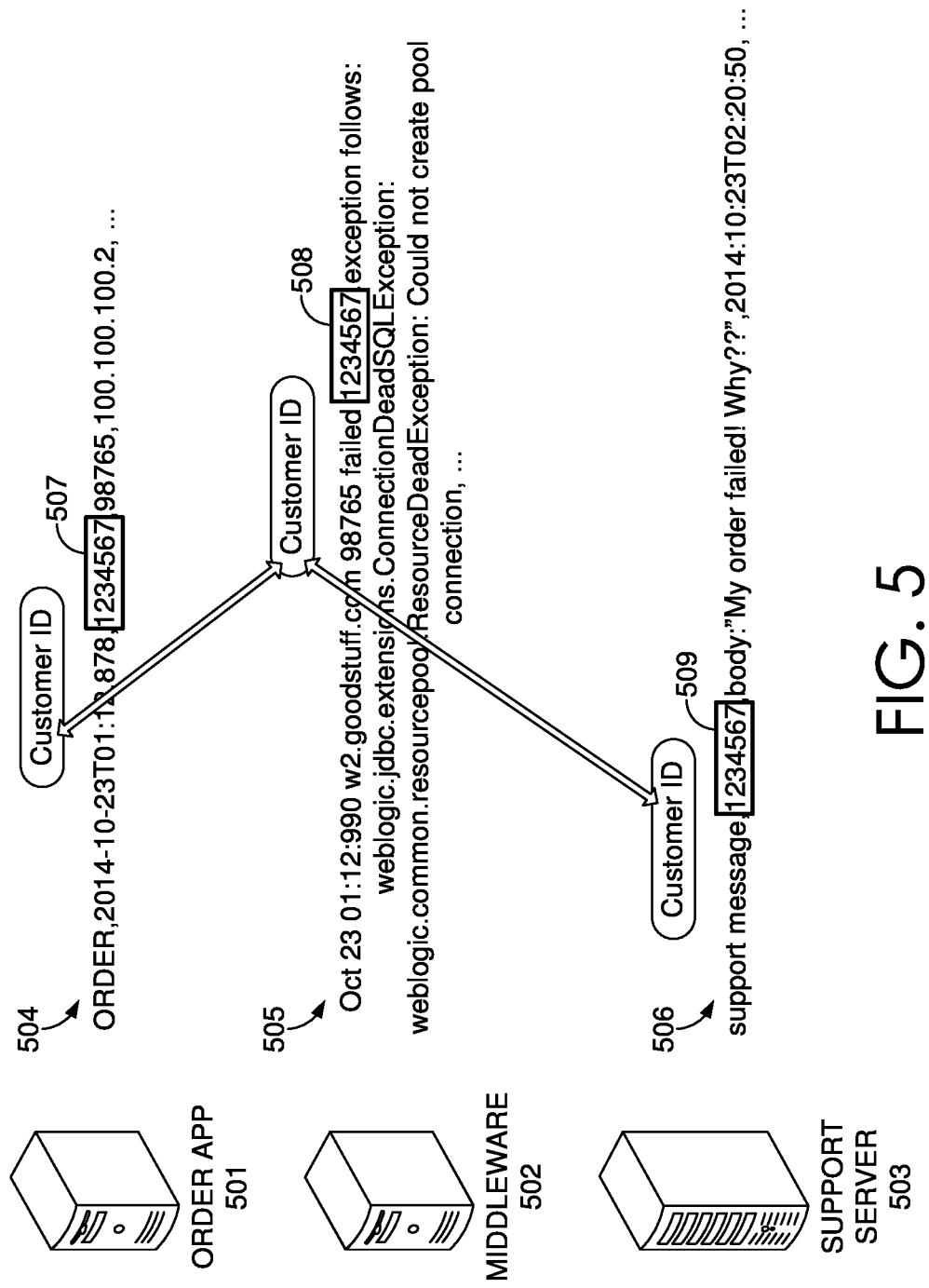

FIG. 6A

Data Summary

| Hosts (5) | Sources (8) | Sourcetypes (3) | | ✕ | filter

| Host ◊ | | Count ◊ | Last Update ◊ |
|---|---|---|---|
| mailsv | ⊪ ∨ | 9,829 | 4/29/14 1:32:47.000 PM |
| vendor_sales | ⊪ ∨ | 30,244 | 4/29/14 1:32:46.000 PM |
| www1 | ⊪ ∨ | 24,221 | 4/29/14 1:32:44.000 PM |
| www2 | ⊪ ∨ | 22,595 | 4/29/14 1:32:47.000 PM |
| www3 | ⊪ ∨ | 22,975 | 4/29/14 1:32:45.000 PM |

FIG. 6B

INCIDENT REVIEW DATSHBOARD 910

Incident Review | Actions▼

| Status: | | Urgency: high | | Title: | |
| Security domain: | | Governance: pci | | Owner: | |
| | | | | Search: | |

INCIDENT ATTRIBUTE FIELDS 911 2010

TIME RANGE FIELD 912

[24 hour window ▼]
- Last 15 minutes
- Last 60 minutes
- Last 4 hours
- Last 24 hours
- Last 7 days
- Last 30 days
- Last year
- Real-time
- All time
- Other
- Custom time...

✓ 225 matching events

Hide | Zoom out | Zoom to selection | [u] Deselect | | | Save ▼ | Create ▼ | Linear scale ▼ | 1 bar = 1 hour

TIMELINE 913

120 / 60

4:00 AM Sun Aug 26 2012 — 6:00 AM — 8:00 AM 225 events in a 24 hour window (real-time) (from 11:29:20 AM August 25 to 11:29:20 AM August 26, 2012) | Edit selected events | Edit all 225 matching Select all | Unselect all  « prev  1  2  3  4  5  6  7  8  9  10  next »

EVENTS LIST 914

| Select | Options | Time | Security Domain | Title | Urgency | Status | Owner | |
|---|---|---|---|---|---|---|---|---|
| ☐ | ▶ | 8/26/12 11:11:03.000 AM | Access ▼ | Insecure Or Cleartext Authentication Detected ▼ | ① High ▼ | New ▼ | unassigned ▼ | View details |
| ☐ | ▶ | 8/26/12 11:10:07.000 AM | Access ▼ | Insecure Or Cleartext Authentication Detected ▼ | ① High ▼ | New ▼ | unassigned ▼ | View details |
| ☐ | ▶ | 8/26/12 11:00:39.000 AM | Access ▼ | Account (bliinebry) Deleted On (PROD-POS-001) ▼ | ① High ▼ | New ▼ | unassigned ▼ | View details |
| ☐ | ▶ | 8/26/12 11:00:39.000 AM | Access ▼ | Account (beu) Deleted On (COREDEV-006) ▼ | ① High ▼ | New ▼ | unassigned ▼ | View details |
| ☐ | ▶ | 8/26/12 11:00:39.000 AM | Access ▼ | Account (combs) Deleted On (HOST-005) ▼ | ① High ▼ | New ▼ | unassigned ▼ | View details |
| ☐ | ▶ | 8/28/12 | Access ▼ | Account (wisner) Deleted On (BUSDEV-005) ▼ | ① High ▼ | New ▼ | unassigned ▼ | View details |

FIG. 9B

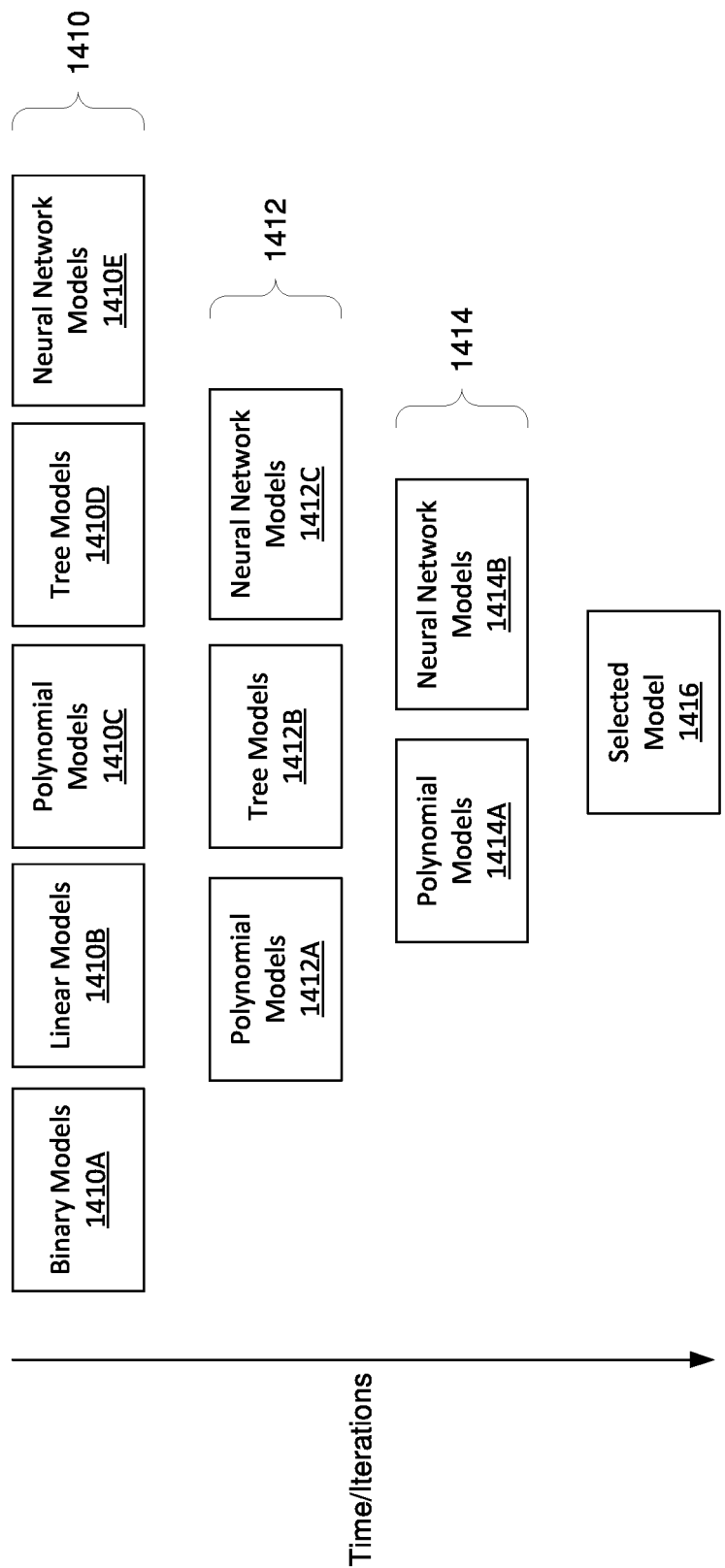

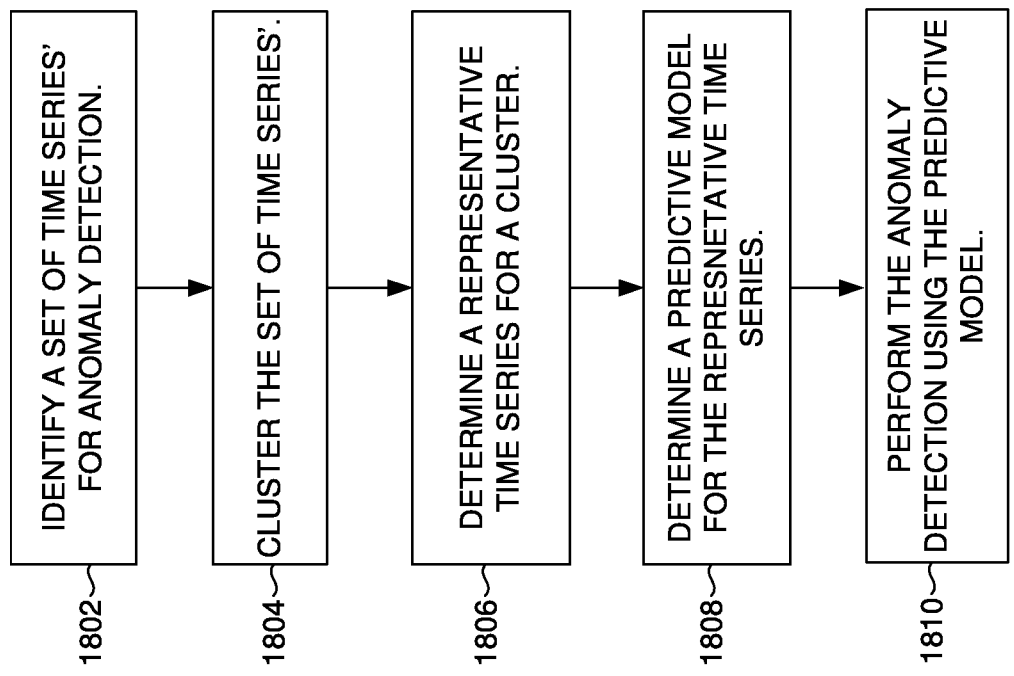

DETECTION OF ANOMALIES IN A TIME SERIES USING VALUES OF A DIFFERENT TIME SERIES

CROSS-REFERENCE TO RELATED APPLICATIONS

This application is a Continuation of U.S. patent application Ser. No. 15/420,737 filed Jan. 31, 2017 and titled "ANOMALY DETECTION BASED ON RELATIONSHIPS BETWEEN MULTIPLE TIME SERIES," the entire contents of which are incorporated by reference herein.

BACKGROUND

Modern data centers often include thousands of hosts that operate collectively to service requests from even larger numbers of remote clients. During operation, components of these data centers can produce significant volumes of raw, machine-generated data. In many cases, it is desirable detected anomalies from such collected data.

SUMMARY

Embodiments of the present invention are directed to anomaly detection based on relationships between multiple time series. This summary is not intended to identify key features or essential features of the claimed subject matter, nor is it intended to be used as an aid in determining the scope of the claimed subject matter.

BRIEF DESCRIPTION OF THE DRAWINGS

In the drawings:

FIG. 5 illustrates a scenario where a common customer ID is found among log data received from three disparate sources in accordance with the disclosed embodiments;

FIG. 6A illustrates a search screen in accordance with the disclosed embodiments;

FIG. 6B illustrates a data summary dialog that enables a user to select various data sources in accordance with the disclosed embodiments;

FIG. 9B illustrates an incident review dashboard in accordance with the disclosed embodiments;

FIG. 14A illustrates an example of generating and selecting predictive models for a time series, in accordance with disclosed embodiments;

FIG. 18 is a flow diagram depicting an illustrative method in accordance with disclosed embodiments.

DETAILED DESCRIPTION

Figure 1:
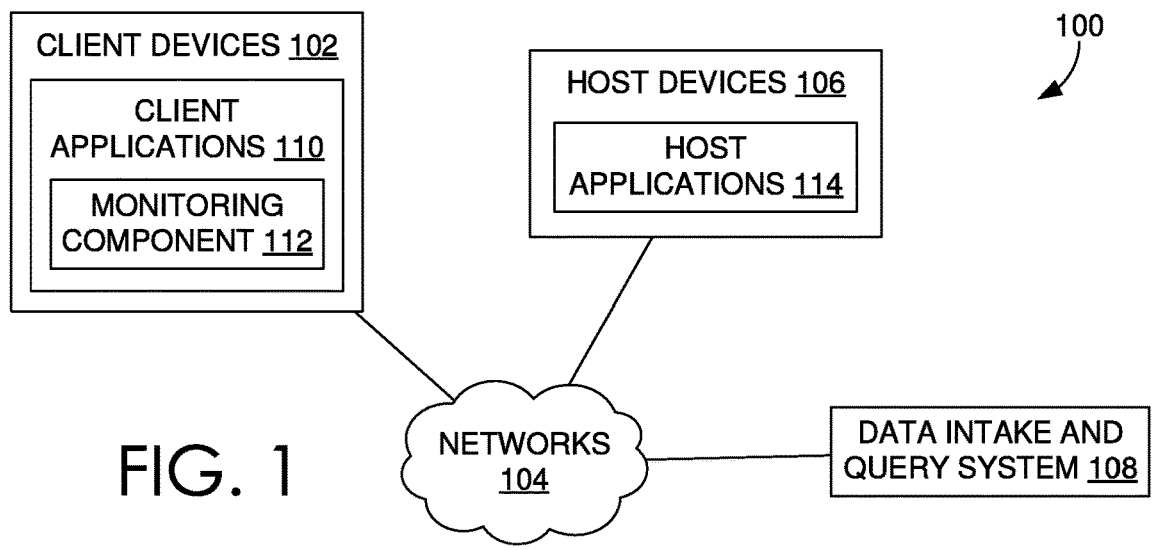
FIG. 1 illustrates a networked computer environment in which an embodiment may be implemented.

Embodiments are described herein according to the following outline:
1.0. General Overview
2.0. Operating Environment
   2.1. Host Devices
   2.2. Client Devices
   2.3. Client Device Applications
   2.4. Data Server System
   2.5. Data Ingestion
   2.5.1. Input
   2.5.2. Parsing
   2.5.3. Indexing
   2.6. Query Processing
   2.7. Field Extraction
   2.8. Example Search Screen
   2.9. Data Modeling
   2.10. Acceleration Techniques
   2.10.1. Aggregation Technique
   2.10.2. Keyword Index
   2.10.3. High Performance Analytics Store
   2.10.4. Accelerating Report Generation
   2.11. Security Features
   2.12. Data Center Monitoring
   2.13. Cloud-Based System Overview
   2.14. Searching Externally Archived Data
   2.14.1. ERP Process Features
   2.15. Searching Externally Archived Data 3.0. Anomaly Detection Based on Relationships Between Multiple Time Series
  3.1. Anomaly Detection Tool in a Data Processing Environment
  3.2. Generation and Selection of Predictive Models
  3.2.1 Features of Predictive Models
  3.2.1 Evaluation of Predictive Models
  3.2.3 Approximation Mining
  3.3. Anomaly Detection using Predictive Models
  3.4. Illustrative Examples
  3.5. Illustrative Hardware System
  1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
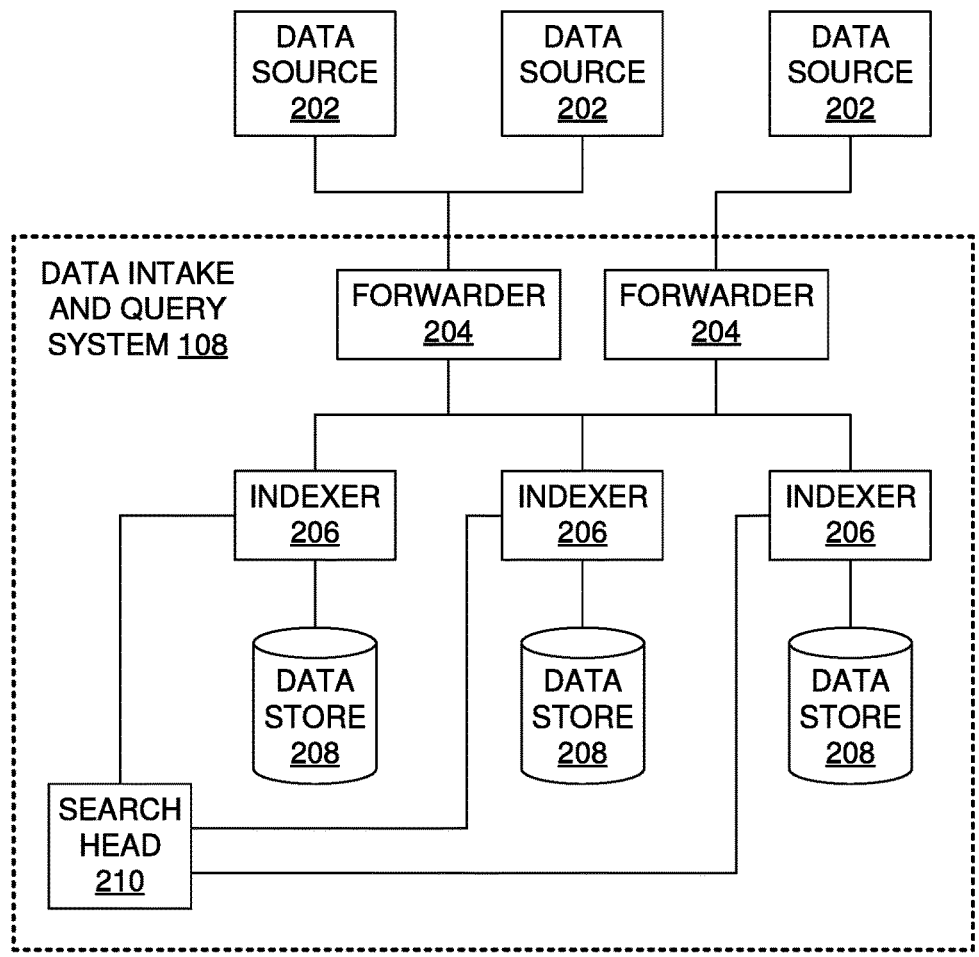
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
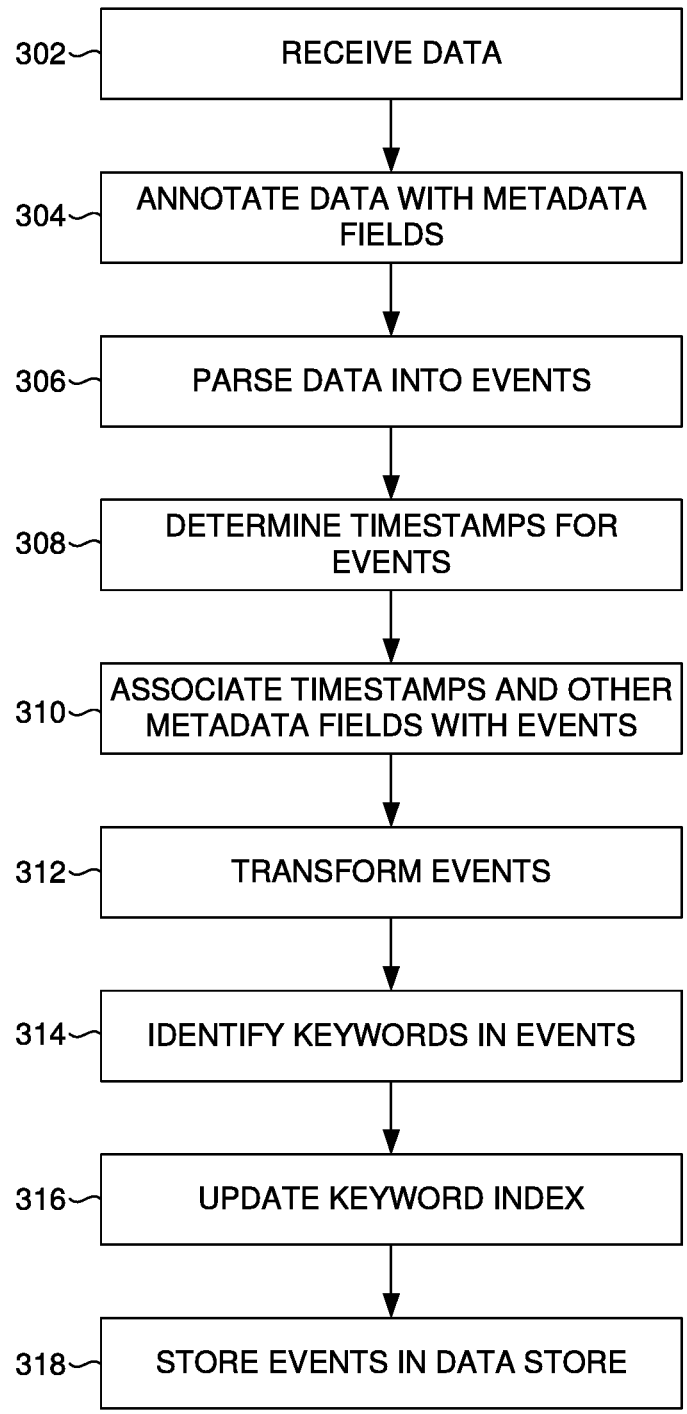
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
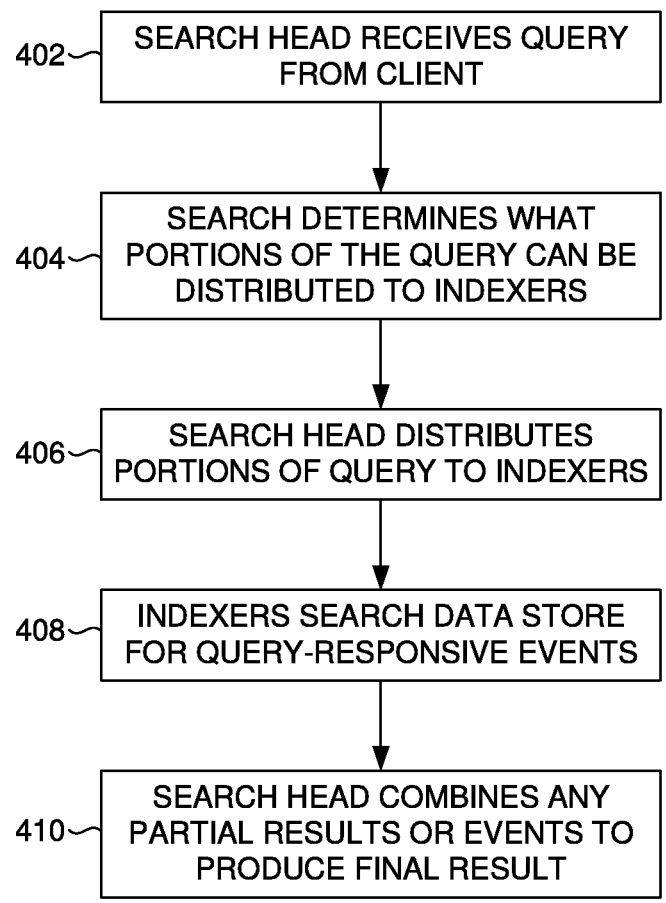
FIG. 4 is a flow diagram that illustrates how a search head and indexers perform a query in accordance with the disclosed embodiments.
Figure 7:
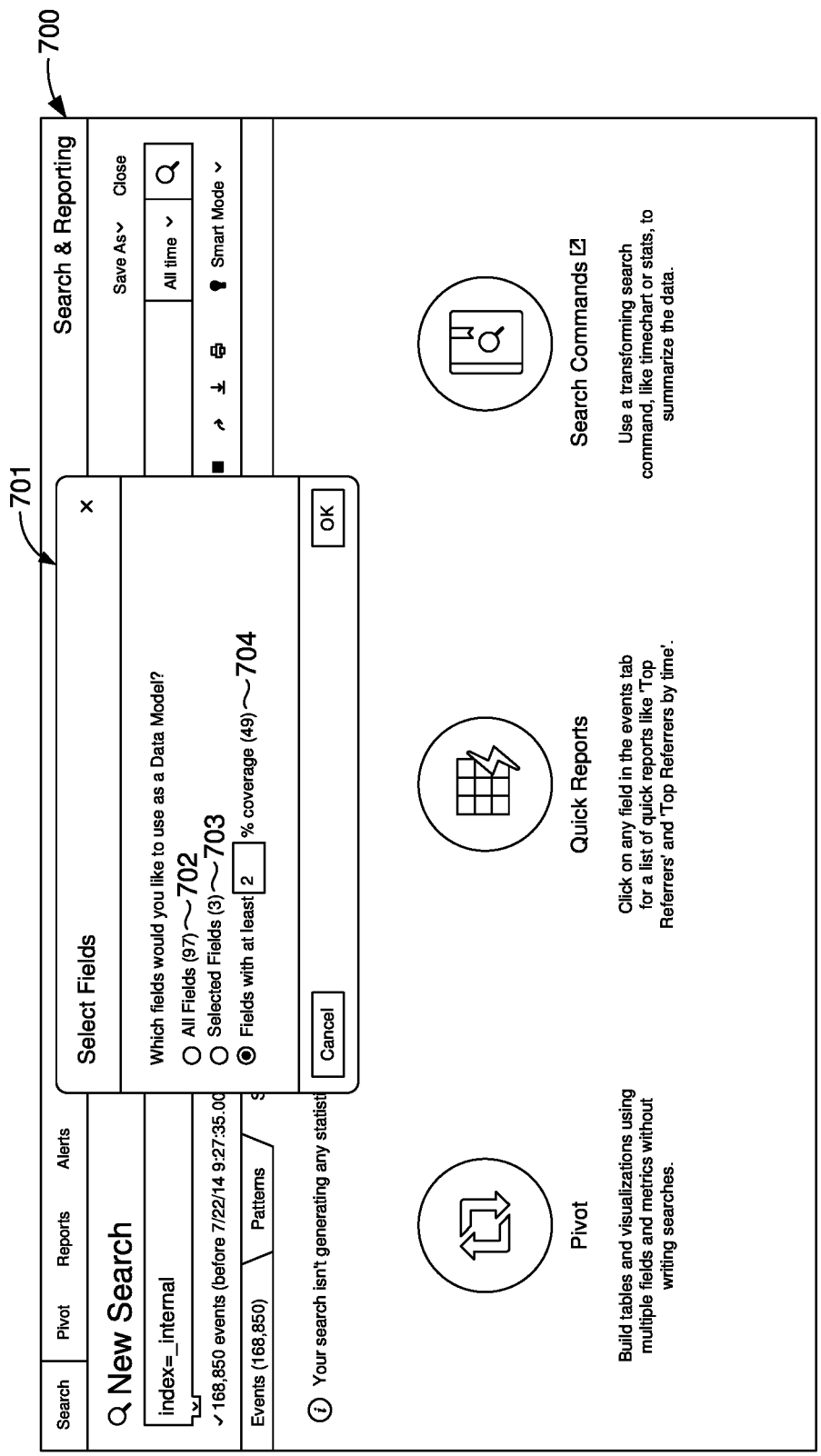
FIG. 7 illustrates a user interface screen for an example data model-driven report generation interface in accordance with the disclosed embodiments.

FIG. 4 is a flow diagram that illustrates an example process that a search head and one or more indexers may perform during a query. At block 402, a search head receives a query from a client. At block 404, the search head analyzes the query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other pipelined an non-pipelined query languages (e.g., the Structured Query Language ("SQL")) can be used to create a query.

In response to receiving the query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
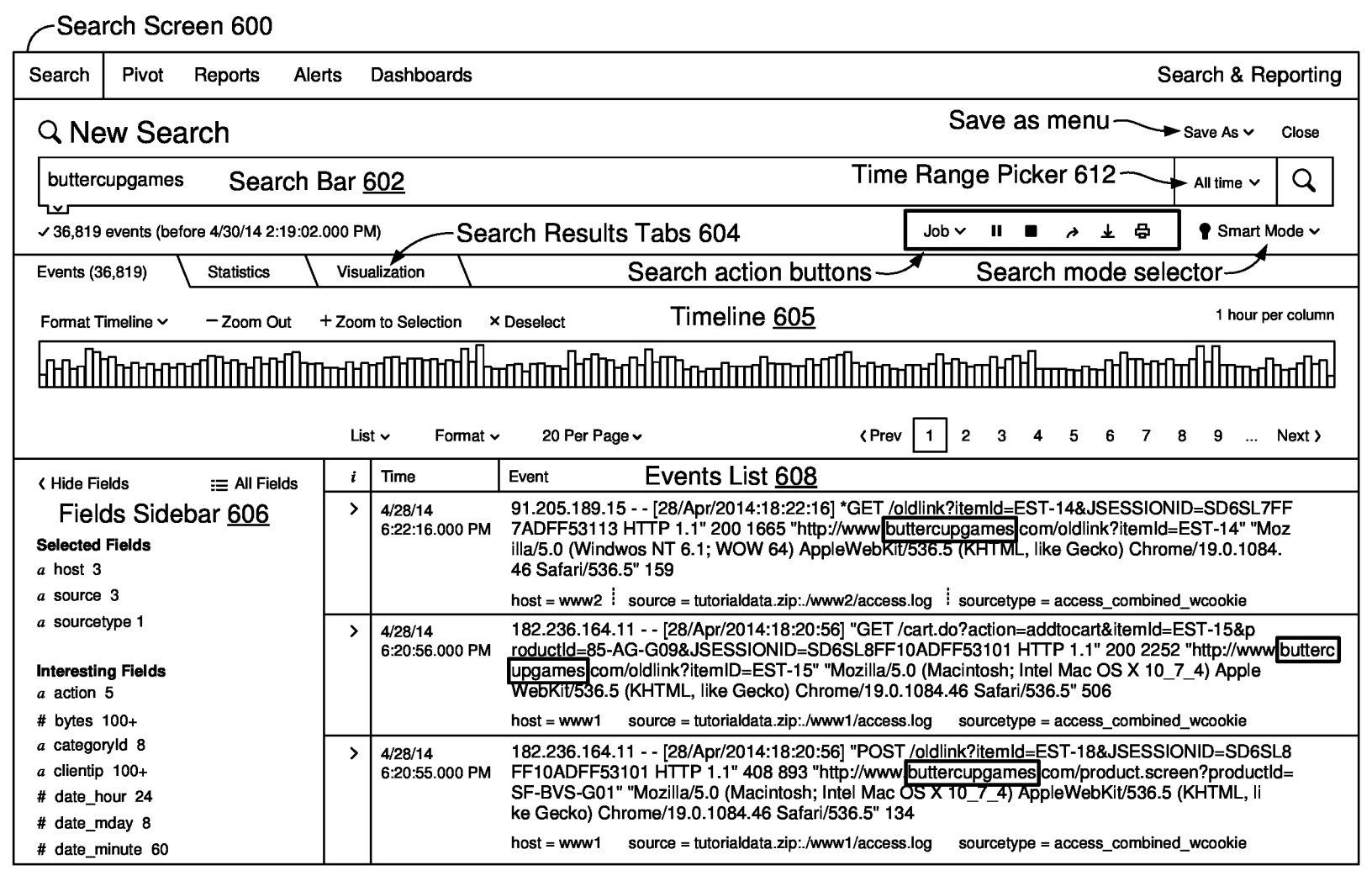

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "3.5ed fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in Fig.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

2.10. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.10.1. Aggregation Technique

Figure 8:
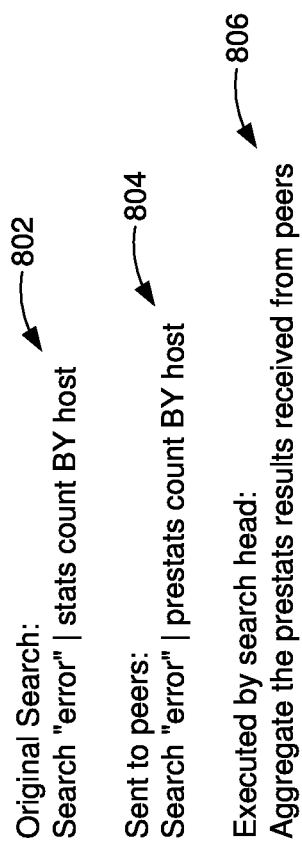
FIG. 8 illustrates an example query received from a client and executed by search peers in accordance with the disclosed embodiments.

To facilitate faster query processing, a query can be structured such that multiple indexers perform the query in parallel, while aggregation of search results from the multiple indexers is performed locally at the search head. For example, FIG. 8 illustrates how a query 802 received from a client at a search head 210 can split into two phases, including: (1) subtasks 804 (e.g., data retrieval or simple filtering) that may be performed in parallel by indexers 206 for execution, and (2) a search results aggregation operation 806 to be executed by the search head when the results are ultimately collected from the indexers.

During operation, upon receiving query 802, a search head 210 determines that a portion of the operations involved with the query may be performed locally by the search head. The search head modifies query 802 by substituting "stats" (create aggregate statistics over results sets received from the indexers at the search head) with "prestats" (create statistics by the indexer from local results set) to produce query 804, and then distributes query 804 to distributed indexers, which are also referred to as "search peers." Note that queries may generally specify search criteria or operations to be performed on events that meet the search criteria. Queries may also specify field names, as well as search criteria for the values in the fields or operations to be performed on the values in the fields. Moreover, the search head may distribute the full query to the search peers as illustrated in FIG. 4, or may alternatively distribute a modified version (e.g., a more restricted version) of the query to the search peers. In this example, the indexers are responsible for producing the results and sending them to the search head. After the indexers return the results to the search head, the search head aggregates the received results 806 to form a single search result set. By executing the query in this manner, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.11. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 9A:
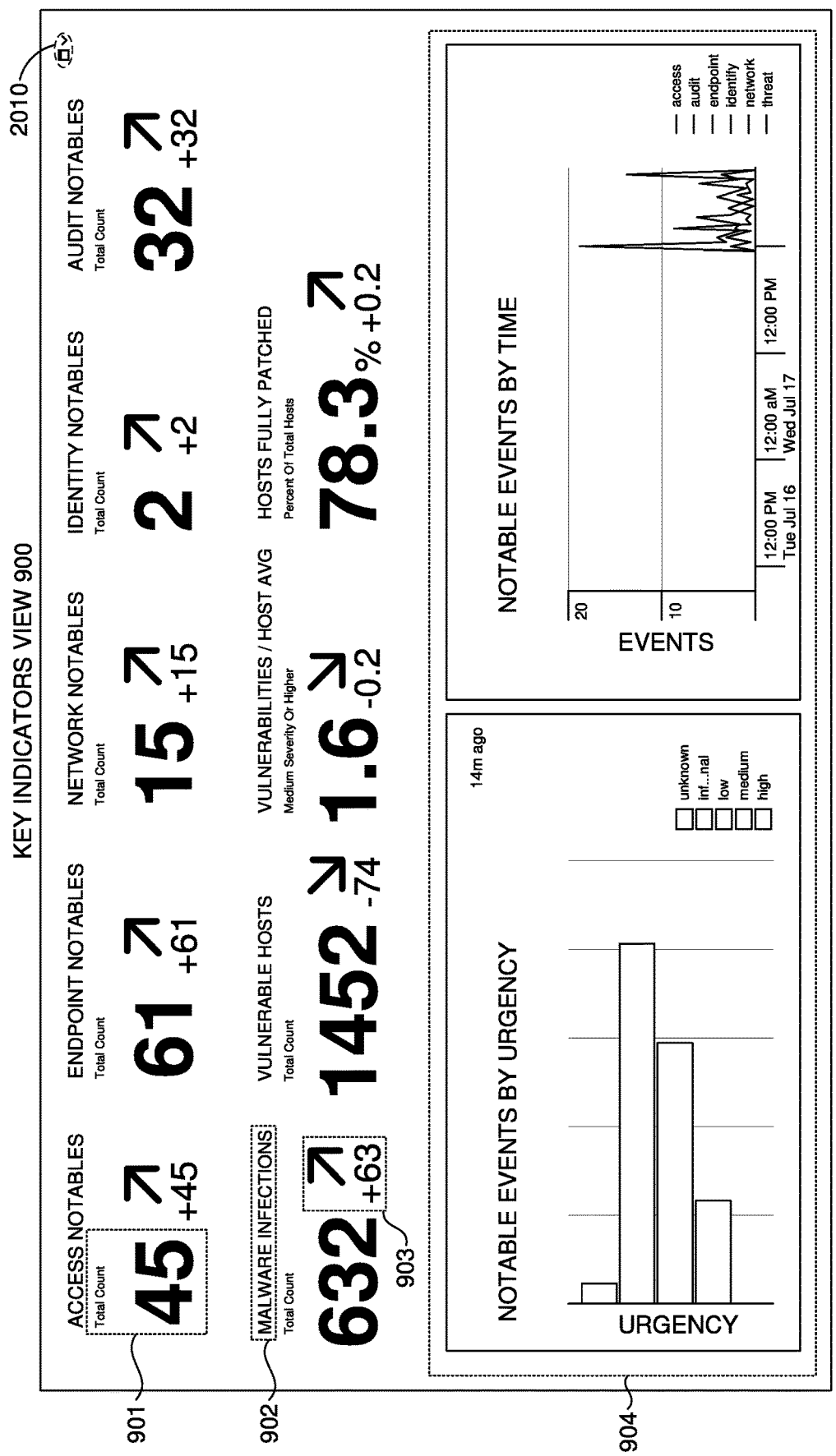
FIG. 9A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics, such as counts of different types of notable events. For example, FIG. 9A illustrates an example key indicators view 900 that comprises a dashboard, which can display a value 901, for various security-related metrics, such as malware infections 902. It can also display a change in a metric value 903, which indicates that the number of malware infections increased by 63 during the preceding interval. Key indicators view 900 additionally displays a histogram panel 904 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 9B illustrates an example incident review dashboard 910 that includes a set of incident attribute fields 911 that, for example, enables a user to specify a time range field 912 for the displayed events. It also includes a timeline 913 that graphically illustrates the number of incidents that occurred in time intervals over the selected time range. It additionally displays an events list 914 that enables a user to view a list of all of the notable events that match the criteria in the incident attributes fields 911. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.12. Data Center Monitoring

As mentioned above, the SPLUNK® ENTERPRISE platform provides various features that simplify the developer's task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

Figure 9C:
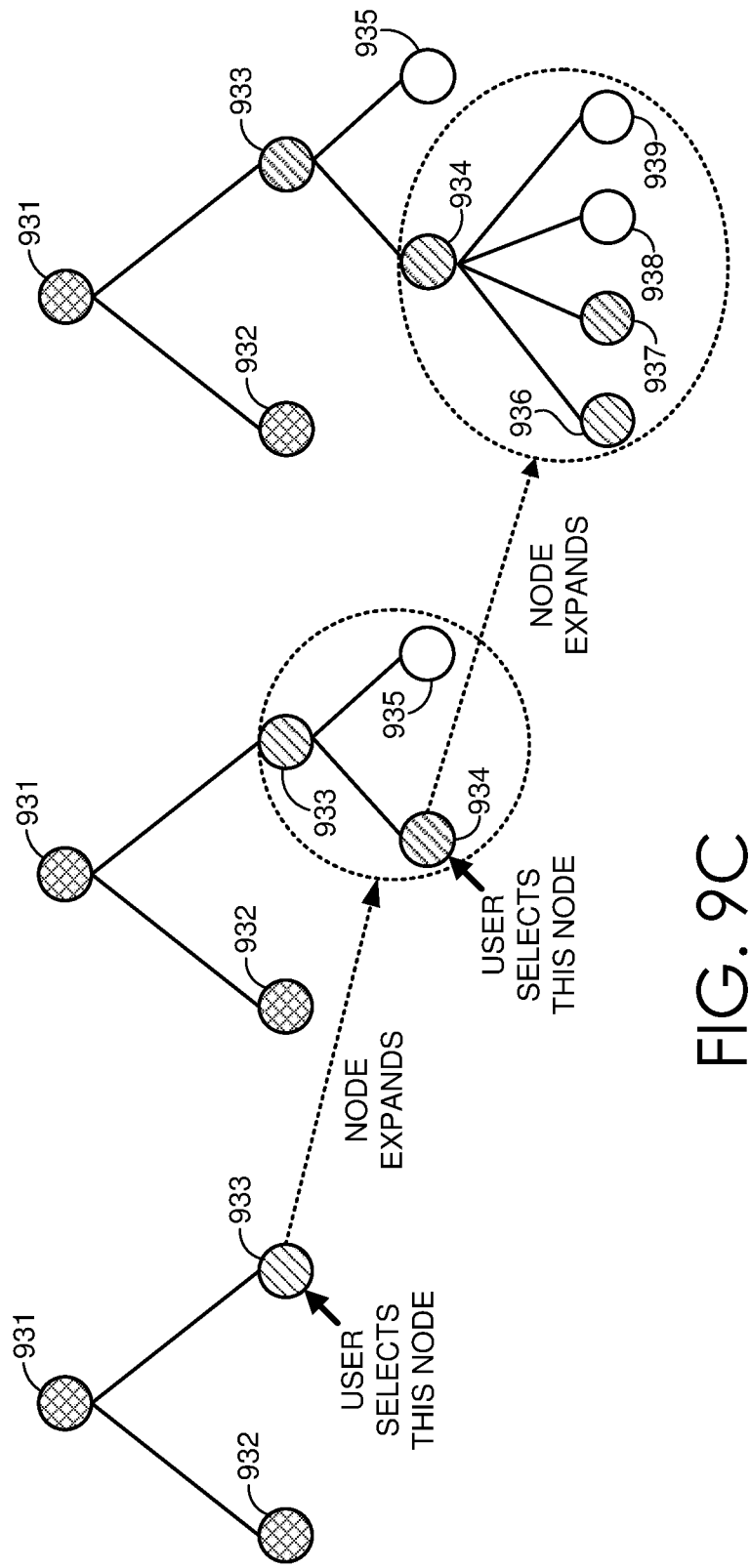
FIG. 9C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 9C, wherein nodes 933 and 934 are selectively expanded. Note that nodes 931-939 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/253,490, entitled "PROACTIVE MONITORING TREE WITH SEVERITY STATE SORTING", filed on 15 Apr. 2014, and U.S. patent application Ser. No. 14/812,948, also entitled "PROACTIVE MONITORING TREE WITH SEVERITY STATE SORTING", filed on 29 Jul. 2015, each of which is hereby incorporated by reference in its entirety for all purposes.

Figure 9D:
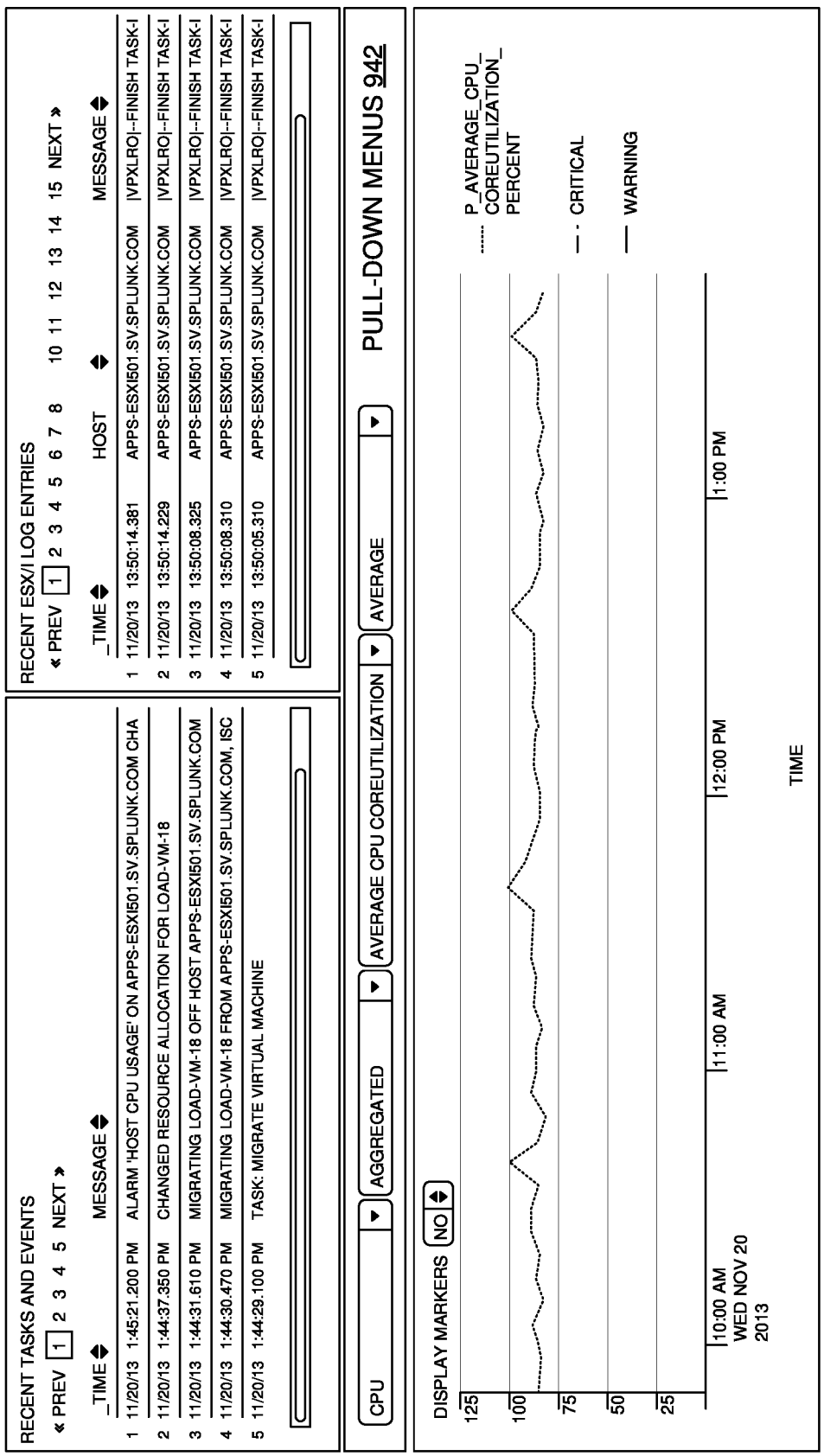
FIG. 9D illustrates a user interface screen displaying both log data and performance data in accordance with the disclosed embodiments.

The SPLUNK® APP FOR VMWARE® also provides a user interface that enables a user to select a specific time range and then view heterogeneous data comprising events, log data, and associated performance metrics for the selected time range. For example, the screen illustrated in FIG. 9D displays a listing of recent "tasks and events" and a listing of recent "log entries" for a selected time range above a performance-metric graph for "average CPU core utilization" for the selected time range. Note that a user is able to operate pull-down menus 942 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.13. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 10:
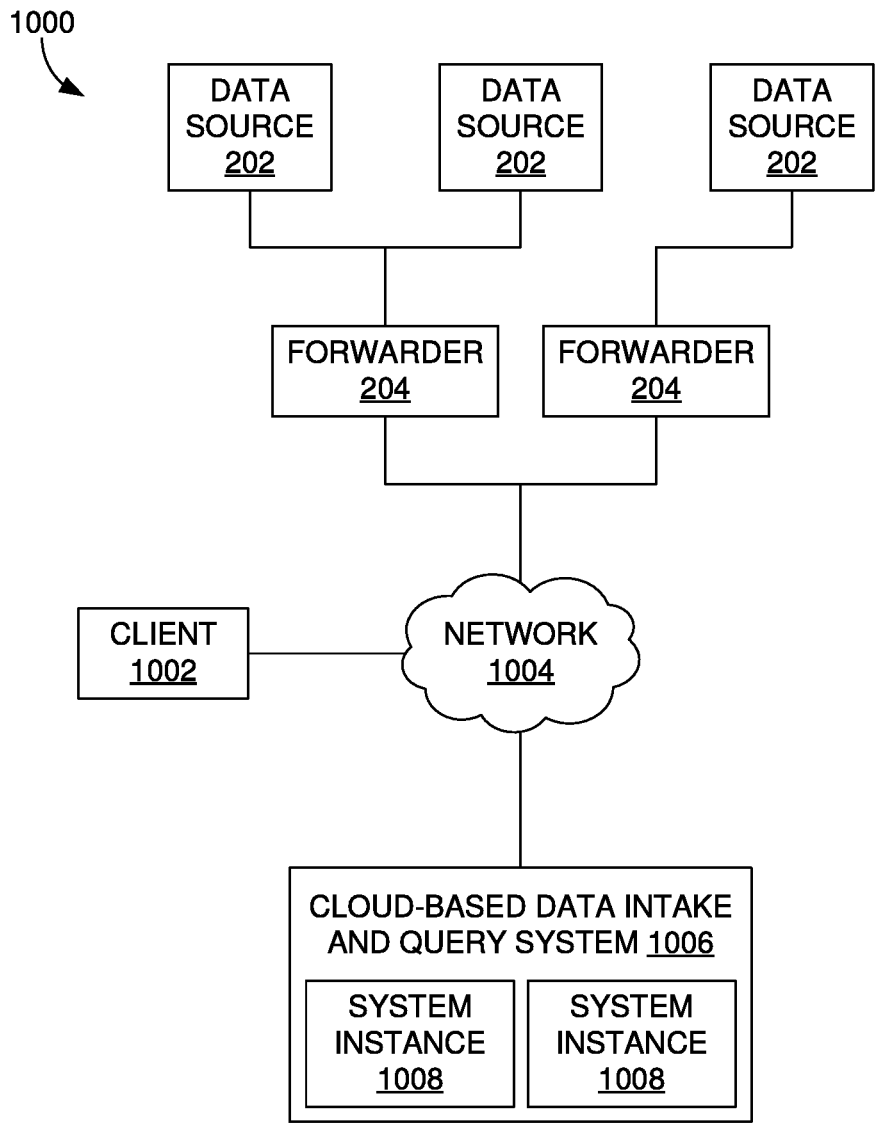
FIG. 10 illustrates a block diagram of an example cloud-based data intake and query system in which an embodiment may be implemented.

FIG. 10 illustrates a block diagram of an example cloud-based data intake and query system. Similar to the system of FIG. 2, the networked computer system 1000 includes input data sources 202 and forwarders 204. These input data sources and forwarders may be in a subscriber's private computing environment. Alternatively, they might be directly managed by the service provider as part of the cloud service. In the example system 1000, one or more forwarders 204 and client devices 1002 are coupled to a cloud-based data intake and query system 1006 via one or more networks 1004. Network 1004 broadly represents one or more LANs, WANs, cellular networks, intranetworks, internetworks, etc., using any of wired, wireless, terrestrial microwave, satellite links, etc., and may include the public Internet, and is used by client devices 1002 and forwarders 204 to access the system 1006. Similar to the system of 108, each of the forwarders 204 may be configured to receive data from an input source and to forward the data to other components of the system 1006 for further processing.

In an embodiment, a cloud-based data intake and query system 1006 may comprise a plurality of system instances 1008. In general, each system instance 1008 may include one or more computing resources managed by a provider of the cloud-based system 1006 made available to a particular subscriber. The computing resources comprising a system instance 1008 may, for example, include one or more servers or other devices configured to implement one or more forwarders, indexers, search heads, and other components of a data intake and query system, similar to system 108. As indicated above, a subscriber may use a web browser or other application of a client device 1002 to access a web portal or other interface that enables the subscriber to configure an instance 1008.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 1008) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.15. Searching Externally Archived Data

Figure 11:
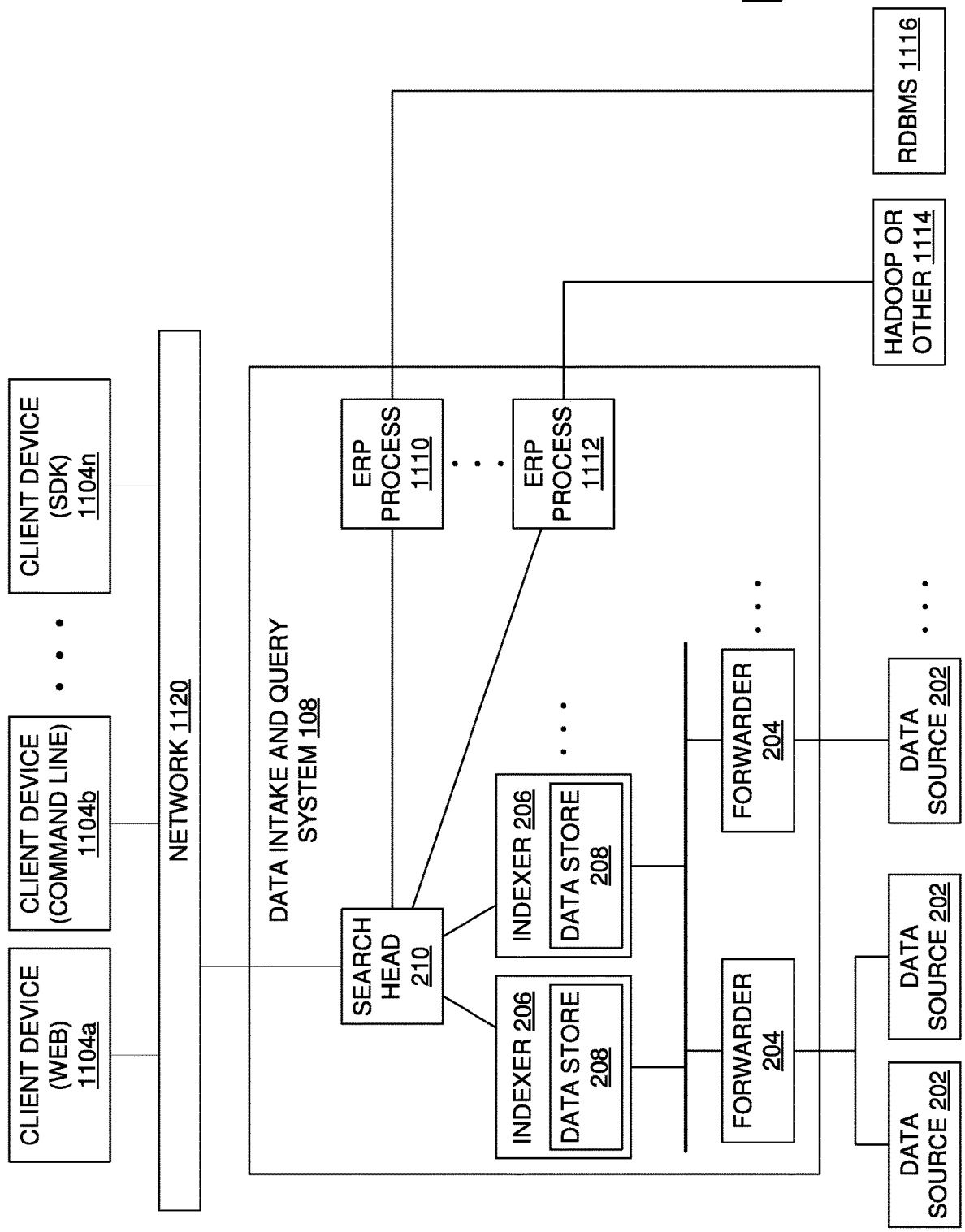
FIG. 11 illustrates a block diagram of an example data intake and query system that performs searches across external data systems in accordance with the disclosed embodiments.

FIG. 11 shows a block diagram of an example of a data intake and query system 108 that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head 210 of the data intake and query system receives search requests from one or more client devices 1104 over network connections 1120. As discussed above, the data intake and query system 108 may reside in an enterprise location, in the cloud, etc. FIG. 11 illustrates that multiple client devices 1104a, 1104b, . . . , 1104n may communicate with the data intake and query system 108. The client devices 1104 may communicate with the data intake and query system using a variety of connections. For example, one client device in FIG. 11 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1104 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1110. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 1110, 1112. FIG. 11 shows two ERP processes 1110, 1112 that connect to respective remote (external) virtual indices, which are indicated as a Hadoop or another system 1114 (e.g., Amazon S3, Amazon EMR, other Hadoop Compatible File Systems (HCFS), etc.) and a relational database management system (RDBMS) 1116. Other virtual indices may include other file organizations and protocols, such as Structured Query Language (SQL) and the like. The ellipses between the ERP processes 1110, 1112 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all query references to a Hadoop file system may be processed by the same ERP process, if the ERP process is suitably configured. Likewise, all query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 1110, 1112 receive a search request from the search head 210. The search head may optimize the received search request for execution at the respective external virtual index. Alternatively, the ERP process may receive a search request as a result of analysis performed by the search head or by a different system process. The ERP processes 1110, 1112 can communicate with the search head 210 via conventional input/output routines (e.g., standard in/standard out, etc.). In this way, the ERP process receives the search request from a client device such that the search request may be efficiently executed at the corresponding external virtual index.

The ERP processes 1110, 1112 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1110, 1112 generate appropriate search requests in the protocol and syntax of the respective virtual indices 1114, 1116, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 1104 may communicate with the data intake and query system 108 through a network interface 1120, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.14.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the ]streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the query request, and calculating statistics on the results. The user can request particular types of data, such as if the query itself involves types of events, or the search request may ask for statistics on data, such as on events that meet the search request. In either case, the search head understands the query language used in the received query request, which may be a proprietary language. One example of a query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.14. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, Calif.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

3.0 Anomaly Detection Based on Relationships Between Multiple Time Series

Data may be collected as a time series data set, that is, a sequence of data points of a time series, often including successive measurements made over a time interval. Each data point may include a corresponding time stamp and value of the time series. However, in some cases, a time stamp need not be included with a data point. For example, a time series may generally refer to an ordered sequence of time series values. The ordering of values may be based on temporal information (e.g., in machine data) corresponding to the values. A time series can correspond to one or more metrics, where a metric represents a particular characteristic of computer activity. In some cases, each data point in a time series may correspond to a measurement of the particular characteristic represented by the metric. Examples of metrics include security-related metrics, industrial metrics (e.g., corresponding to data produced by industrial equipment), business metrics, behavioral metrics (e.g., corresponding to data produced as a result of actions, using a range of devices connected to the Internet, such as a PC, tablet, or smartphone), transactional metrics (e.g., corresponding to data describing a change as a result of a transaction, and/or performance metrics.

A time series data set may be determined or derived from machine data. As indicated above, sources of the machine data can include information processing logs, market transactions, and sensor data from real-time monitors (supply chains, military operation networks, or security systems). For example, in some cases, each data point of a time series is derived from machine data associated with one or more time stamped records, such as events. A value and/or time stamp of a data point may correspond to one or more values associated with an event (e.g., statistics or field values).

It is often desirable to monitor a time series data set in order to detect anomalies in associated values. For example, anomalous or unusual behavior of a time series can indicate some underlying problem in a computing system or service associated with the time series. When an anomaly occurs in a time series data set, it is often critical to quickly notify appropriate users or otherwise take appropriate action. For example, an anomaly in a security-related metric could indicate a security breach or an anomaly in a performance metric could indicate a system malfunction. When functioning properly, computer anomaly detection technology allows for these objectives to be met by automatically monitoring metrics for anomalies and executing appropriate actions when anomalies are detected.

An effective approach to detecting anomalies can leverage relationships between different time series data sets. In particular, values associated with a first time series data set may historically exhibit similar behavior to values associated with a second time series data set. Thus, values associated with the second time series data set provide information useful for predicting values associated with the first data set. For example, when the values associated with the first time series data set sufficiently deviate from predicted values, it may indicate one of the time series data sets did not behave as expected and therefore an anomaly may be detected.

To illustrate the forgoing, assume a first metric represents CPU load related to a computing service and a second metric represents bandwidth utilization related to the computing service. Under normal circumstances, the two metrics may exhibit a cohesive relationship, where their associated values tend to rise and fall together. A deviation from the cohesive relationship can indicate some underlying problem related to the service, and therefore it is effective to detect an anomaly based on the deviation.

In order to accurately detect anomalies, conventional computer anomaly detection technologies require a user to identify particular metrics which are expected to exhibit a cohesive relationship. It is assumed all of the identified metrics are related to one another by the same cohesive relationship, which may be not true. Additionally, the relationships between the metrics may change over time, such that they may not always exhibit the cohesive relationship while still behaving in an acceptable manner. Therefore, conventional computer anomaly detection technologies are prone to false positives or negatives in anomaly detection unless these specific criteria are satisfied. Some embodiments of the present disclosure allow these shortcomings to be remedied.

Figure 12:
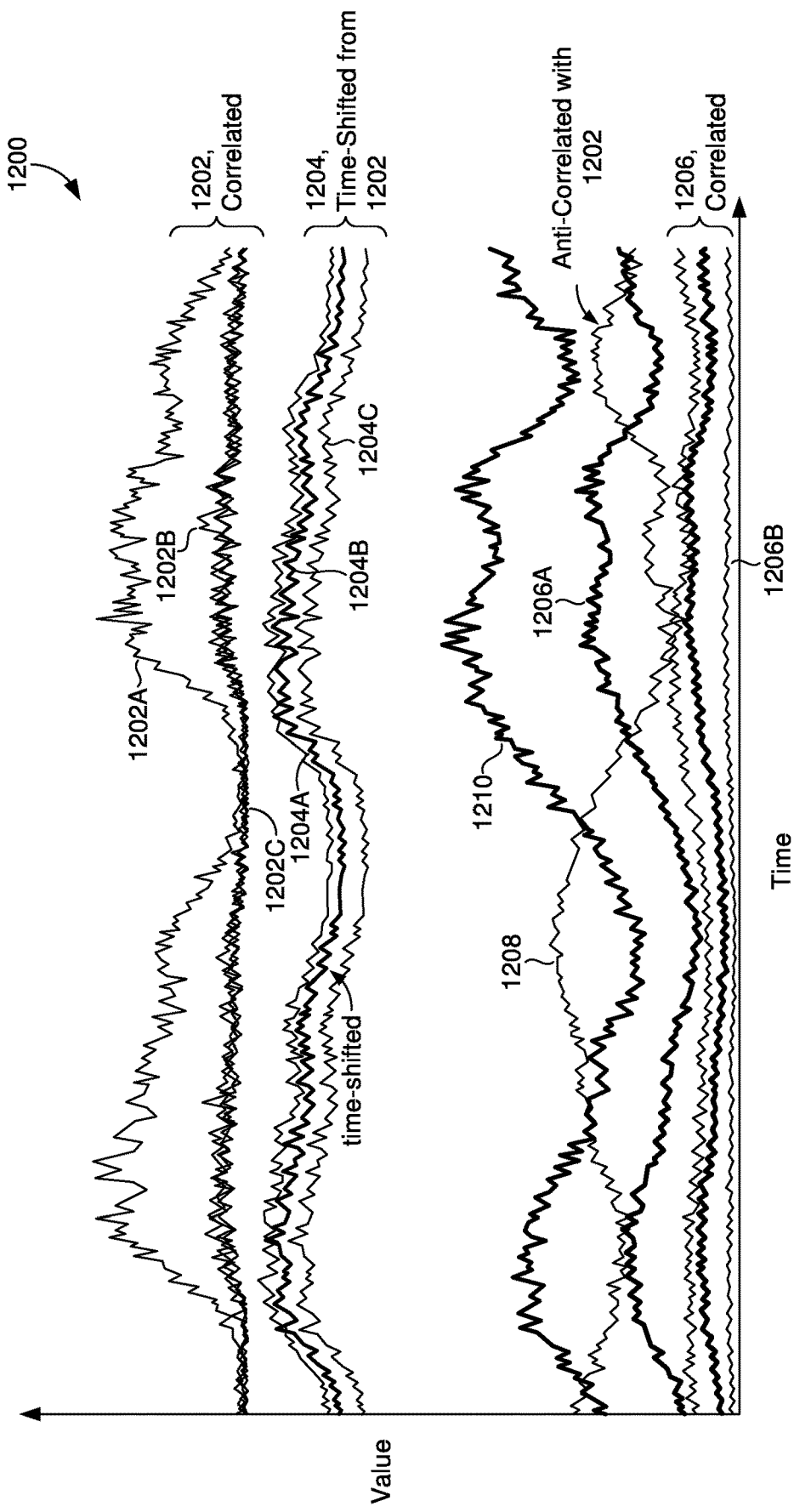
FIG. 12 illustrates illustrate an example visualization of time series data sets in accordance with disclosed embodiments.

Aspects of the present disclosure are discussed with respect to FIG. 12, by way of example. FIG. 12 illustrates visualization 1200 of time series data sets in accordance with disclosed embodiments. Visualization 1200 is a graphical representation of values associated with time series data sets 1202A, 1202B, and 1202C (collectively 1202), time series data sets 1204A, 1204B, and 1204C (collectively 1204), time series data sets 1206A and 1206B (collectively 1206), time series data set 1208, and time series data set 1210. Each time series data set is of a time series, which may correspond to one or more metrics. The data points associated with the time series data sets are graphed in visualization 1200, where time stamps correspond to the X-axis and values correspond to the Y-axis.

Using approaches described herein, a user may optionally identify and/or select a set of time series and/or time series data sets corresponding to the time series for anomaly detection, such as those shown in visualization 1200. In response to or based on a user selection or other user interaction associated with the time series data sets, a search is performed on the time series data sets to automatically determine and identify one or more relationships, if any, between any combination of the time series data sets.

Unlike conventional approaches, in various embodiments, all of the time series data sets need not have a cohesive relationship with one another for anomaly detection to function properly. Also, the search can cover many types of relationships between time series data sets and is not limited to cohesive relationships. For example, the search can identify time series data sets 1202 having a cohesive relationship with one another, time series data sets 1206 having a cohesive relationship with one another, time series data sets 1204 having a time-shifted relationship with each of time series data sets 1202, time series data set 1208 having an anti-correlated relationship with time series data sets 1206 (i.e., as one rises, the other falls and as one falls, the other rises), and time series 1210 which is unrelated to any others shown in FIG. 12.

In some aspects of the present disclosure, relationships between time series data sets are automatically determined by analyzing values associated with the time series data sets. Each relationship is captured by a predictive model, which is configured to generate predicted values associated with at least one time series using values from at least one other time series. A predictive model can be a machine learning model which is trained to predict future values (e.g., data points) associated with a time series given corresponding values (e.g., data points) of at least one other time series based on prior behavior of the multiple time series, such as the behavior represented in FIG. 12. Anomalies are detected based on identifying deviations between the predicted values and actual values associated with the multiple time series.

To illustrate the forgoing, a predictive model could predict values of time series 1202A that increase from previous values based on actual values in time series data sets 1202B and 1202C increasing due to the cohesive relationship. If it is determined at least one of the corresponding actual values of time series data set 1202A is sufficiently different than at least one of the predicted values (e.g., based on a threshold relative to a predicted value being exceeded by an actual value), an anomaly may be detected. For example, the values could fall when they were predicted to rise, or not rise by a sufficient amount.

In some implementations, in order to search for and select a predictive model to use for anomaly detection on values associated with a time series (e.g., at least one time series), a plurality of predictive models is generated for the time series. Each predictive model can be configured to independently predict the values associated with the time series using values associated with at least one other time series. For example, one predictive model may predict values of time series data set 1202A based on values from time series data set 1202B (e.g., they may be explanatory variables), another predictive model may be similar, but use a different predictor function, and another may predict values of time series data set 1202A based on values from both time series data sets 1202B and 1202C. A predictive model is selected from the generated models for the anomaly detection based on an evaluation of the predicted values produced by the model. For example, the most accurate predictive model may be selected for anomaly detection, or no predictive model may be selected if none are sufficiently accurate.

3.1 Anomaly Detection Tool in a Data Processing Environment

Figure 13:
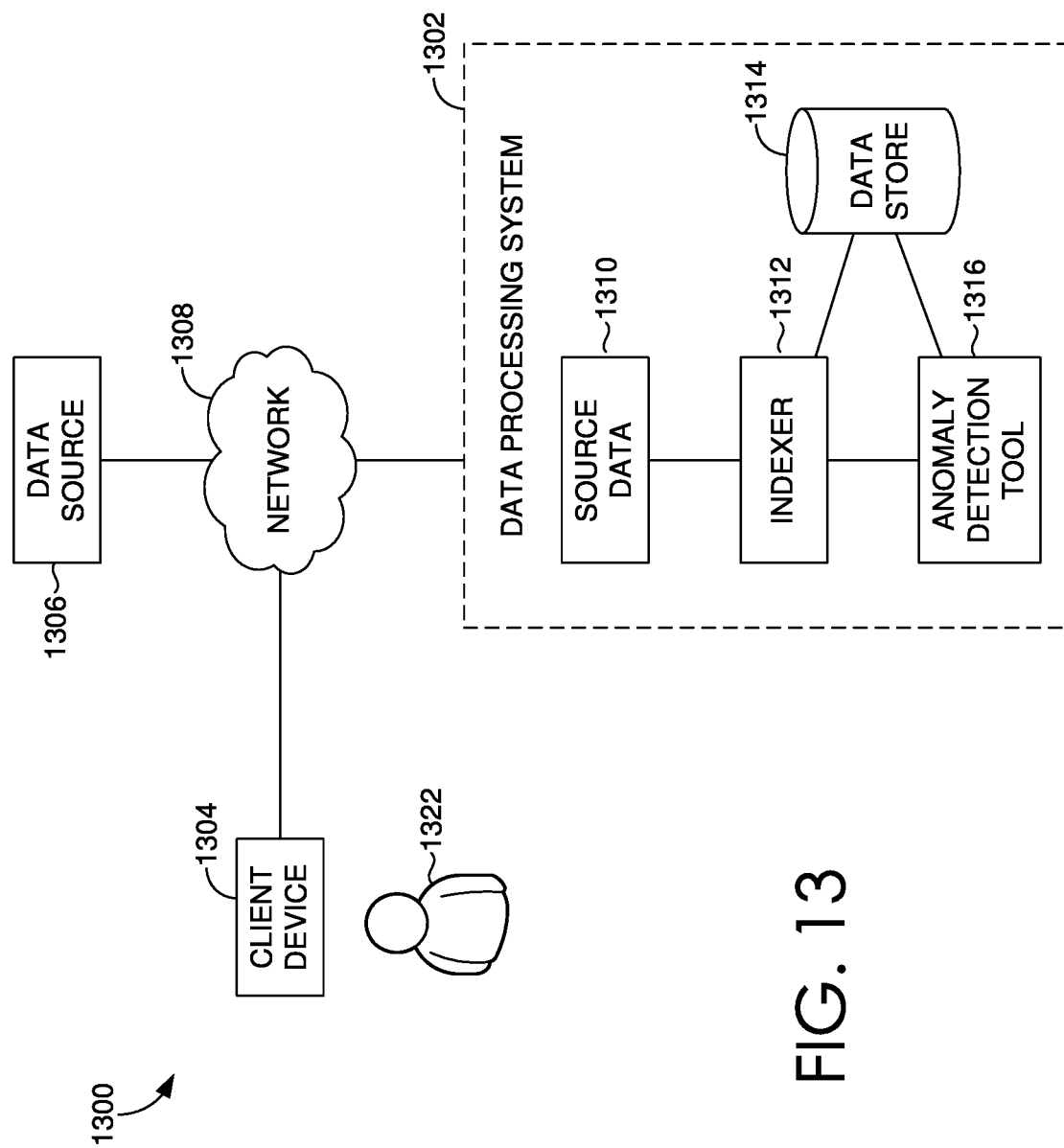
FIG. 13 illustrates an example of a data processing environment in accordance with disclosed embodiments.

FIG. 13 illustrates an example of a data processing environment in which an anomaly detection tool may be employed in accordance with various embodiments of the present disclosure. However, it will be appreciated that many variations are possible. Generally, data processing environment 1300 provides for, or enables, the management, storage, and retrieval of data to determine relationships between time series data sets and detect anomalies using those determined relationships.

As shown in FIG. 13, data processing environment 1300 includes anomaly detection tool 1316 used to determine relationships between time series data sets and detect anomalies using those determined relationships. Anomaly detection tool 1316 can utilize historical time series data sets to generate predictive models which predict values of time series data sets using values of other time series data sets. Anomaly detection tool 1316 can further detect anomalies in time series data sets based on evaluating predicted values from their associated predictive models with respect to actual values associated with the time series data sets.

Anomaly detection tool 1316 can, in some cases, be integrated into components of the various systems and environments described above, such as those depicted in FIGS. 1, 2, 10, and 11. For example, client device 1304 can correspond to client device 1002, client devices 102, or client devices 1104; data source 1306 can correspond to data sources 202; indexer 1312 can correspond to indexers 206; data store 1314 can correspond to data stores 208; and network 1308 can correspond to any combination of networks 104, 1004, and 1120 described above.

Data processing system 1302 is communicatively coupled to one or more client devices 1304 and one or more data sources 1306 via a communications network 1308. Network 1308 may include an element or system that facilitates communication between the entities of data processing environment 1300. Network 1308 may include an electronic communications network, such as the Internet, a local area network (LAN), a wide area network (WAN), a wireless local area network (WLAN), a cellular communications network, and/or the like. In some embodiments, network 1308 includes a wired or a wireless network. In some embodiments, network 1308 includes a single network or a combination of networks.

Data source 1306 may be at least one source of incoming source data 1310 being fed into the data processing system 1302. Data source 1306 can be or include one or more external data sources, such as web servers, application servers, databases, firewalls, routers, operating systems, and software applications that execute on computer systems, mobile devices, sensors, and/or the like. Data source 1306 may be located remote from data processing system 1302. For example, data source 1306 may be defined on an agent computer operating remote from data processing system 1302, such as on-site at a customer's location, that transmits source data 1310 to data processing system 1302 via a communications network (e.g., network 1308).

Source data 1310 can be a stream or set of data fed to an entity of data processing system 1302, such as a forwarder (e.g., forwarder 204) or indexer 1312. In some embodiments, source data 1310 can be heterogeneous machine-generated data received from various data sources, such as servers, databases, applications, networks, and/or the like. Source data 1310 may include, for example raw data (e.g., raw time-series data), such as server log files, activity log files, configuration files, messages, network packet data, performance measurements, sensor measurements, and/or the like. For example, source data 1310 may include log data generated by a server during the normal course of operation (e.g., server log data). In some embodiments, source data 1310 may be minimally processed to generate minimally processed source data. For example, source data 1310 may be received from data source 1306, such as a server. Source data 1310 may then be subjected to a small amount of processing to break the data into events. As discussed, an event generally refers to a portion, or a segment of the data, that is associated with a time. The resulting events may optionally be indexed (e.g., stored in a raw data file associated with an index file). In some embodiments, indexing source data 1310 may include additional processing, such as compression, replication, and/or the like.

Source data 1310 might be structured data or unstructured data. Structured data has a predefined format, wherein specific data items with specific data formats reside at predefined locations in the data. For example, data contained in relational databases and spreadsheets may be structured data sets. In contrast, unstructured data does not have a predefined format. This means that unstructured data can comprise various data items having different data types that can reside at different locations.

Indexer 1312 of data processing system 1302, when present, may receive source data 1310, for example, from a forwarder (not shown in FIG. 13) or data source 1306, and apportion source data 1310 into events. Indexer 1312 may be an entity of data processing system 1302 that indexes data, transforming source data 1310 into events and placing the results into data store 1314 (e.g., and index). Indexer 1312 may also search data stores 1314 in response to requests or queries. Indexer 1312 may perform other functions, such as data input and search management.

During indexing, and at a high-level, indexer 1312 can facilitate taking data from its origin in sources, such as log files and network feeds, to its transformation into searchable events that encapsulate valuable knowledge. Indexer 1312 may acquire a raw data stream (e.g., source data 1310) from its source (e.g., data source 1306), break it into blocks (e.g., 64K blocks of data), and/or annotate each block with metadata keys. After the data has been input, the data can be parsed. This can include, for example, identifying event boundaries, identifying event timestamps (or creating them if they don't exist), masking sensitive event data (such as credit card or social security numbers), applying custom metadata to incoming events, and/or the like. Accordingly, the raw data may be data broken into individual events. The parsed data (also referred to as "events") may be written to a data store, such as an index or data store 1314.

Data store 1314 (e.g., data store 208) may include a medium for the storage of data thereon. For example, data store 1314 may include non-transitory computer-readable medium storing data thereon that is accessible by entities of data processing environment 1300, such as indexer 1312 and anomaly detection tool 1316. As can be appreciated, data store 1314 may store the data (e.g., events) in any manner. In some implementations, the data may include one or more indexes including one or more buckets, and the buckets may include an index file and/or raw data file (e.g., including parsed, time-stamped events). In some embodiments, each data store is managed by a given indexer that stores data to the data store and/or performs searches of the data stored on the data store. Although a single data store 1314 could be employed, embodiments may include multiple data stores, such as a plurality of distributed data stores.

Events within data store 1314 may be represented by a data structure that is associated with a certain point in time and includes a portion of raw machine data (e.g., a portion of machine-generated data that has not been manipulated). An event may include, for example, a line of data that includes a time reference (e.g., a timestamp), and one or more other values. In some embodiments, events can correspond to data that is generated on a regular basis and/or in response to the occurrence of a given event. In the context of server log data, for example, a server that logs activity every second may generate a log entry every second, and the log entries may be stored as corresponding events of the source data. Similarly, a server that logs data upon the occurrence of an error event may generate a log entry each time an error occurs, and the log entries may be stored as corresponding events of the source data.

In accordance with some embodiments, events within data store 1314 can corresponds to time series data sets analyzed and/or monitored by anomaly detection tool 1316, such as time series data sets shown in FIG. 12. For example, in some cases, time stamps of data points may correspond to time stamps associated with one or more of events and values of data points may correspond to field values associated with the one or more events (e.g., extracted from the portions of machine data of the events). For a time series, a value of a data point may correspond to ones or more fields values from the same set of fields for each event. Further, as described above, a field may be defined by an extraction rule which extracts the field values from the events. Also, an extraction rule may be defined by a query on events. Thus, a time series may correspond to a search on the events. Further, the search may be ongoing as data is ingested by data processing environment 1300 resulting in new data points being generated for the time series data sets.

Although anomaly detection tool 1316 is illustrated and described herein as a separate component, this is for illustrative purposes. Anomaly detection tool 1316 or functions described in association therewith, can be performed at indexer 1312, a search head (not shown), or any other component of data processing environment 1300. For example, some functionality described in association with anomaly detection tool 1316 might be performed at a search head, while other functionality described in association with anomaly detection tool 1316 might be performed at an indexer. Also, in various embodiments, the time series data sets available to anomaly detection tool 1316 need not correspond to events, and can be generated and stored in any suitable manner.

As indicated above, anomaly detection tool 1316 may optionally be initiated by a user of client device 1304. For example, client device 1304 may be used or otherwise accessed by a user 1322, such as a system administrator or a customer. Client device 1304 may include any variety of electronic devices. In some embodiments, client device 1304 can include a device capable of communicating information via network 1308. Client device 1304 may include one or more computer devices, such as a desktop computer, a server, a laptop computer, a tablet computer, a wearable computer device, a personal digital assistant (PDA), a smart phone, and/or the like. In some embodiments, a client device 1304 may be a client of event processing system 1302. Client device 1304 can include various input/output (I/O) interfaces, such as a display (e.g., for displaying a graphical user interface (GUI), an audible output user interface (e.g., a speaker), an audible input user interface (e.g., a microphone), an image acquisition interface (e.g., a camera), a keyboard, a pointer/selection device (e.g., a mouse, a trackball, a touchpad, a touchscreen, a gesture capture or detecting device, or a stylus), and/or the like.

In some embodiments, client device 1304 can include general computing components and/or embedded systems optimized with specific components for performing specific tasks. In some embodiments, client device 1304 can include programs/applications that can be used to generate a request for content, to provide content, to render content, and/or to send and/or receive requests to and/or from other devices via network 1308. For example, client device 1304 may include an Internet browser application that facilitates communication with data processing system 1302 via network 1308. In some embodiments, a program, or application, of client device 1304 can include program modules having program instructions that are executable by a computer system to perform some or all of the functionality described herein with regard to at least client device 1304.

Anomaly detection can be initiated, triggered, and/or configured by instructions from client device 1304, which may be user provided via a graphical user interface (GUI). In some embodiments, data processing system 1302 provides the display of the GUI. Such a GUI can be displayed on client device 1304, and can present information relating to initiating, performing, and viewing results of anomaly detection and/or predictive model generation, and/or configuring settings and parameters of any of the forgoing.

Anomaly detection and model generation can be performed upon events being created, indexed, and stored, or before or as events are created, indexed, and/or stored. Further, these functions may be automatically triggered, possibly without user initiation. In some cases, upon initially establishing anomaly detection, subsequent prediction analyses may be automatically triggered and performed as new data is received. Further, predictive models used in anomaly detection may be updated over time, such as based on an analysis of subsequently created, indexed, and/or stored events or data points.

3.2 Generation and Selection of Predictive Models

As described above, a set of time series data sets can be identified or selected for anomaly detection and/or predictive model generation by a user or otherwise. In response, predictive models can be generated and/or selected for one or more time series corresponding to the set of time series data sets. For example, for a given time series corresponding to the set of time series data sets, anomaly detection tool 1316 can attempt to generate and select a predictive model for anomaly detection. This may be performed by a search process where many predictive models are generated for the same time series, the accuracy or suitability of the various predictive models are analyzed and evaluated, and at least one of the predictive models is selected for use in anomaly detection associated with the time series. An example of such a process is shown and described with respect to FIG. 14A.

FIG. 14A illustrates an example of generating and selecting predictive models for a time series, in accordance with embodiments of the present disclosure. As shown in FIG. 14A, predictive models 1410 can be generated for a given time series. Selected model 1416, which is a subset of predictive models 1410 is selected from predictive models 1410 for use in anomaly detection based on an analysis of outputs (e.g., predicted values) from predictive models 1410. As will later be described in additional detail, generating and selecting predictive models can optionally be an iterative process where in each iteration, predictive models 1410 are evaluated and narrowed until one or more models (e.g., selected model 1416) is selected for anomaly detection associated with the time series. In the example shown, predictive models 1410 are narrowed to predictive models 1412 in one iteration, predictive models 1412 are narrowed to predictive models 1414 in a subsequent iteration, and predictive models 1414 are narrowed to selected model 1416 in a subsequent iteration.

Each predictive model 1410 for the time series is generated from sequences of time series values, such as those corresponding to data points of any combination of the time series data sets shown in FIG. 12. The predictive models can be machine learning models, which learn from the sequences of time series values to generation predicted values associated with the time series. In particular, each predictive model may learn to generate predicted values associated with the time series using values of at least one other time series.

Figure 14B:
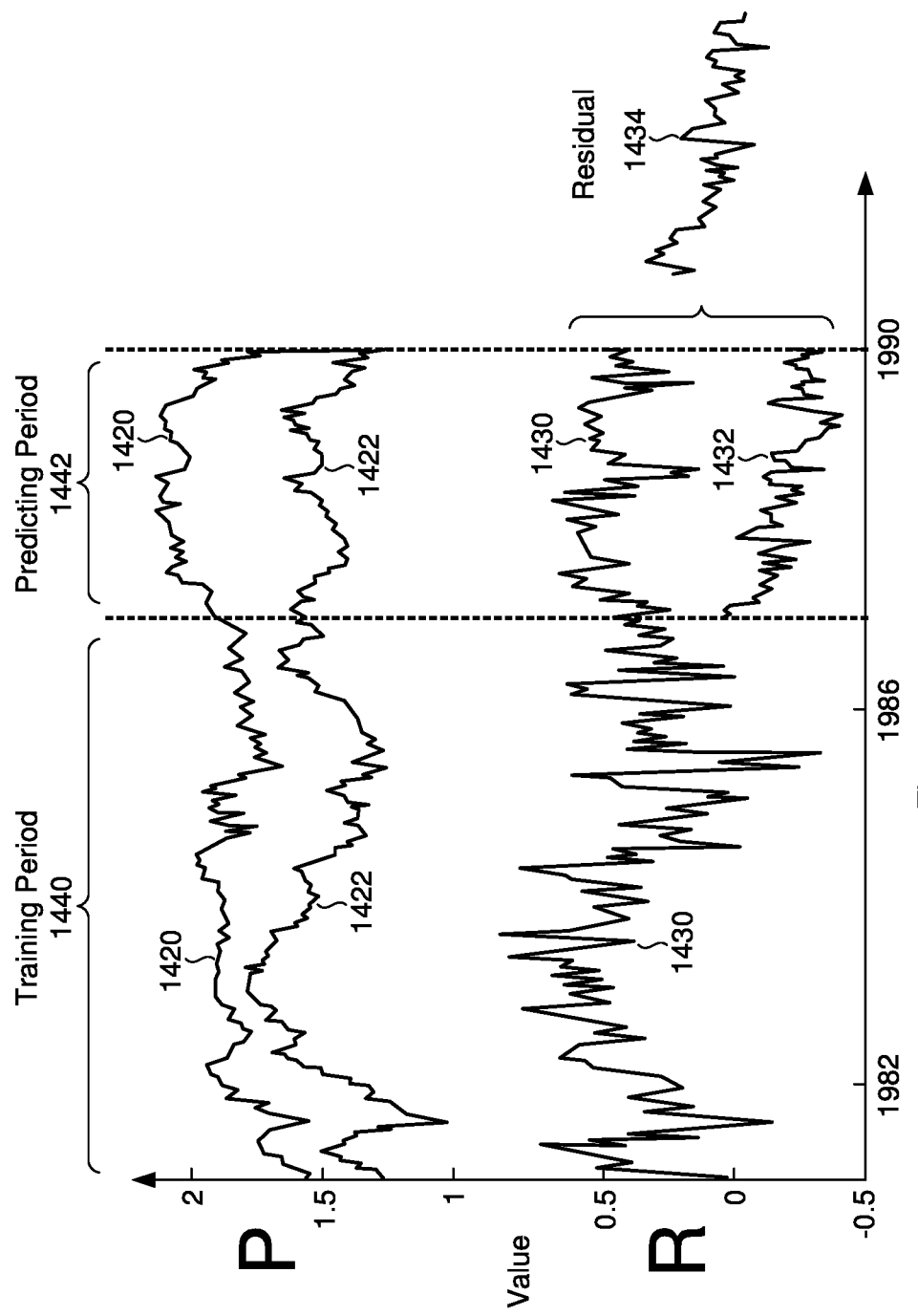
FIG. 14B illustrates a diagram used to describe training and evaluating a predictive model in accordance with disclosed embodiments.

FIG. 14B illustrates a diagram used to describe training and evaluating a predictive model in accordance with some embodiments of the present disclosure. The predictive model can be any of predictive models 1410. The predictive model is trained using values of time series 1420, time series 1422, and time series 1430 from training period 1440. In particular, the predictive model uses values of those time series to learn to predict values of time series 1430 from values of time series 1420 and time series 1422. Although this example is for predicting values of time series 1430 from values of two other time series, it should be appreciated that values of any number of time series may be used to learn and predict the time series (e.g., one or more) and different numbers of time series and different time series may be used for different ones of predictive models 1410. Typically, each time series used to predict another time series is selected from the set of time series identified for anomaly detection and/or predictive model generation. Selection of these time series will later be described in further detail.

The training of the predictive model can use supervised learning where values from the multiple time series are used to generate training examples and the predictive model uses the training examples to infer a function for predicting the values associated with time series 1430 from time series 1420 and time series 1422 (or whichever time series are used for prediction). Examples of suitable types of predictive models are shown in FIG. 14A. For example, any number of and combination of binary models 1410A, linear models 1410B, polynomial models 1410C, tree models 1410B, and neural network models 1410E may be employed. It should be appreciated that all models may be of the same type (e.g., all polynomial), or different types may be used as in the example shown. Different model types have different capabilities of accurately predicting values of a time series depending on the characteristics of the training data. For example, some types of models may be better at predicting certain types of relationships between time series, or other qualities or characteristics of the data. By using many different types models, the most suitable model for the training data may be determined.

Although any suitable supervised learning models may be used, one example of a suitable predictive model is a lasso linear model. The model may use iterative fitting along a regularization path. Another example of a suitable predictive model is a decision tree regressor. A further example of a suitable predictive model is a random forests regressor. This model may be a meta estimator that fits a number of classifying decision trees on various sub-samples of the dataset. The model may use averaging to improve the predictive accuracy and control over-fitting.

3.2.1 Features of Predictive Models

Each predictive model may use data from one or more data sources to make its predictions. For example, a single predictive model could generate predictions from any combination of one or more metrics, event streams, series of time stamps, and data derived from any of the forgoing, from one or more data sources. Features of the predictive models may include values from the multiple time series. However, many types of features may be employed in any suitable combination. These features may capture expected or typical types of relationships observed between time series. In various implementations, these features may be added to one to all data points of the time series used to generate the predictive model. For example, a data point corresponding to an event at a given time may be enriched with fields or features that correspond to the time series at one or more other times, such as five minutes ago, ten minutes ago, etc. In should be appreciated that many different data sources and types of information can be used to enrich a data point of a time series.

By using additional features, the relationships between time series may be more readily identified. Furthermore, the accuracy of anomaly detection may be improved by allowing for the capture of additional characteristics, or behavior, in the time series (e.g., this time series has a spike at 5 PM every day so it should not be considered anomalous). Further, as described below, these additional characteristics may provide additional information that can be conveyed to users in explanatory messages presented in association with detected anomalies.

In order to capture temporal relationships (e.g., time-shifted), one or more temporal features may be used. Examples of temporal features include a time of day, day of the week, periodic based features of the values, and more. Using temporal features, the predictive models may factor in historical values of the time series in addition to current values. Thus, time-shifted relationships may be more readily identified. Other examples of features are aggregated value features, which combine values of a time series into a feature of a predictive model. An example of an aggregated value feature is a sliding window sum of values. Another example is a turbulence feature (e.g., value), which quantifies the turbulence observed in a time series over a window or period of time.

In some implementations, anomaly detection tool 1316 analyzes the times series' and engineer's features for the predictive models based on the analysis. For example, anomaly detection tool 1316 may analyze the time series to determine whether one or more particular features should be included in the predictive models. Based one the determination, the predictive models may be generated using the features, examples of which have been described above. Doing so can reduce processing needed for generating and selecting predictive models by including features likely to be relevant to the time series while excluding other features which are unlikely to be relevant.

3.2.2 Evaluation of Predictive Models

As indicated in FIG. 14B, in some implementations, predictive models are trained over a training period, such as training period 1440. Each training period 1440 can be, for example, at least one hour and use sequences of time series values from time series 1420, time series 1422, and time series 1430 within the training period for training. As mentioned above, in some cases, the time series values can correspond to one or more streams of source data, and the time series values may be extracted from the source data and used for training over training period 1440. By optionally training the predictive models as the source data is received, the models can reflect the current characteristics of the multiple time series.

As indicated in FIG. 14B, in some implementations, predictive models are evaluated over a predicting period, such as predicting period 1442. Each predicting period 1442 can be, for example, at least one hour and use sequences of time series values from time series 1420, time series 1422, and time series 1430 within the prediction period for evaluating the predictive model. As indicated, a predicting period is typically shorter than a training period. Similar to training period 1440, the time series values can correspond to the one or more streams of source data, and may be extracted from the source data and used for evaluating predictive models over predicting period 1442. As shown, the time series values used for predicting periods may be different values than those used for training and may follow the values used for training in the sequences of time series values.

Evaluating a predictive model can be based on determining an error between predicted values generated by the predictive model and actual values (e.g., what the values of time series 1430 actually were at those times) corresponding to those predicted values. In some implementations, the error corresponds to a residual between a predicted value and an actual value of the time series. For example, as shown, the predictive model generates predicted time series 1432 based on values of time series 1420 and time series 1422 within predicting period 1442. Although not shown, predicted time series 1432 may be generated within training period 1440 and could be used for training. Residual time series 1434 is determined from actual values of time series 1430 and corresponding predicted values of predicted time series 1432 within predicting period 1442. The residuals represent differences between time series 1430 and predicted time series 1432 and therefore indicate the accuracy of the predictive model. For example, in general, the smaller the residuals, the more accurate the predictive model. Therefore, the residuals can serve as an effective basis for evaluating the predictive model for accuracy.

As mentioned above, the predictive model may be selected for anomaly detection based on the evaluation. This selection can be based, in part on the determined error (e.g., residual or one or more values derived from the residual) of the model. For example, a model may be selected based on the error failing to exceed a threshold value and/or range of threshold values. Referring to FIG. 14B, errors may be determined for each of predictive models 1410 in order to select a subset of the models. For example, the lower a predictive model's error, the more likely it will be selected for anomaly detection. In some cases, the error of each model may correspond to the same prediction period 1442. Also, each model may be trained using the same training period 1440.

Other factors may be considered in selecting a predictive model for anomaly detection in addition to or instead of the error, or accuracy, of the model. In general, a model may be selected based on one or more of the characteristics of the model, whether it be based on it's model type, accuracy of the model, or non-accuracy related characteristics (e.g., based on evaluating the complexity of the model). In various implementations, one model may be selected over one or more other models based on a comparison between or evaluation of one or more characteristics of the model and/or the other model(s).

In some cases, one or more models may be selected using one or more heuristics based on characteristics of the model and/or other models. As an example, a model may be selected based on the explanatory power of the model and/or other models being considered for selection. To illustrate the forging, if a model of a decision tree type (or other defined type) is less than a defined number (e.g., 3) of levels deep, and the accuracy of the model is no more than a defined percentage (e.g., 5%) lower than at least a second model or model type (e.g., a neural network), the model may be selected.

A predictive model may be selected based on the model's explanatory value. The explanatory value of a predication model can correspond to the relative ease of conveying the relationship captured by the model to a user. As an example, polynomial models will generally have higher explanatory value than a neural network because the function represented by a polynomial model can be presented more concisely or legibly than the function represented by a neural network. Thus, explanatory value of a predictive model may be based on the length of its prediction formula or other complexity related characteristics of the model.

In some cases, explanatory values may be assigned to each predictive model type, and may be preassigned and predetermined prior to training or prediction. As another example, explanatory value could be determined based on analyzing the complexity of the model. More complex models may be considered to have lower explanatory power. Also, more complex models may be more computationally or otherwise resource intensive to use and/or store. Thus, a model may be selected based on evaluating resource requirements associated with the model and/or other models.

From the forgoing, it will be appreciated that any number of predictive models (e.g., selected model 1416) may be selected for anomaly detection and/or continued training and evaluation based on many different potential characteristics of one or more models being considered. Further, where a subset of predictive models is selected multiple times (e.g., in narrowing the models) different characteristics and criteria could be used for different subset selections.

Also from the forgoing, it should be appreciated that in selecting a subset of predictive models 1410, one model may be selected over another despite having higher error based on other factors, such as its higher explanatory value, or other characteristics, such as by using heuristics. These characteristics may be evaluated in any suitable manner including weighting each factor of a predictive model and combining the weighted factors into an evaluation score for the predictive model and/or using conditions or rules based on model characteristics. It is noted that some predictive models may be screened out from selection based on determining their error is sufficiently high. In some cases, predictive models 1410 may be filtered based on their error, and one or more remaining models may be selected based on their explanatory values or other characteristics.

As mentioned above, generating and selecting predictive models can optionally be an iterative process where in each iteration, predictive models 1410 are evaluated and narrowed until one or more models (e.g., selected model 1416) is selected for anomaly detection associated with the time series. As indicated above, in these cases, the evaluating described above may be used for selecting the narrower subset of predictive models. Training may continue for the selected subset of predictive models, whereas the unselected models may be filtered out from training and evaluation. For example, a subsequent training period 1440 and predicting period 1442 may be used for each iteration. In embodiments where models are filtered out, as shown, computing resources are preserved by retaining only the most promising predictive models.

It is noted that in some embodiments, training and/or evaluating predictive models continues or otherwise occurs after the predictive models are selected for anomaly detection, such as during anomaly detection. For example, incoming data which is analyzed for anomalies may also be used to train and/or evaluate selected predictive models. Continued training of predictive models allow the predictive models to adapt to changes in the behavior of the data. Further, continued evaluation allows for tracking accuracies or errors of the models over time. In some cases, based on an error of a model used for anomaly detection, the anomaly detection tool may attempt to generate and select a new predictive model for anomaly detection. This could be accomplished similar to or different than what has been described with respect to FIGS. 14A and 14B. In addition, or instead, the anomaly detection tool may cause an indicator or notification of the error to be transmitted to a user or user device.

3.2.3 Approximation Mining

In some implementations, predictive models are exhaustively generated for each identified time series and combination of parameters and model types. This approach may be referred to as an exhaustive search for predictive models. In other cases, one or more heuristics are used to perform a directed search. Directed searches may use heuristics to prefer one more model type for metrics and another for events or otherwise factor particular model types for time series determined to have one or more designated characteristics. Some approaches may use gradient descent to reduce the search space.

Various approaches to direct search include approximation mining, which attempts to reduce the number of predictive models generated and selected from for a set of time series. Without approximation mining, given a set of time series, anomaly detection tool 1316 could attempt to generate and determine at least one predictive model to predict each time series. Furthermore, for a given time series, a predictive model could be generated and trained for each combination of predictive model type and time series used to predict the time series. While this approach may be practical when the set of time series and the number of predictive model types is small, as these variables rise, the computational resources needed to generate and select predictive models quickly becomes untenable.

In some implementations, anomaly detection tool 1316 performs clustering on the set of time series. In clustering, anomaly detection tool 1316 analyzes the multiple time series in order to group the time series into subsets. Rather than attempting to generate and select predictive models for each time series, anomaly detection tool 1316 may perform this process for each subset. In some cases, anomaly detection tool 1316 down-samples each time series in the set, normalizes the various time series, and smooths each time series (e.g., using a rolling median). Anomaly detection tool 1316 may then apply a clustering algorithm (e.g., a k-means algorithm) to the processed time series to cluster the time series.

A representative time series may be extracted from each cluster (e.g., where each value is the average value of the multiple time series for a given time). Anomaly detection tool 1316 may then perform predictive model selection and generation using the composite time series from each cluster. For example, each predictive model may attempt to predict a given composite time series from at least one other composite time series. When performing anomaly detection on a time series in the initial set of time series, anomaly detection tool 1316 may use the predictive model selected for its associated cluster.

In addition, or instead, anomaly detection tool 1316 may use a divide and conquer approach to approximation mining. Given a set of time series (e.g., initial time series or representative time series of clusters), anomaly detection tool 1316 selects a reference time series (e.g., randomly). Of the remaining set, anomaly detection tool 1316 selects a set of predictor time series to use as predictors of the reference time series (e.g., a random set). Anomaly detection tool 1316 uses the reference time series and the set of predictor time series to generate predictive models and attempt to select a suitable predictive model for the reference time series, as described above. If successful, the reference time series and set of predictor time series is retained as a family and the process repeats with the reduced set of time series. If unsuccessful, the process may repeat with the previous set of time series. This can repeat until each time series is a member of a family. It is noted, a family may only include a reference time series if anomaly detection tool 1316 determines there is no remaining time series available for producing a suitable predictive model for the time series (e.g., by analyzing generated predictive models associated with the reference time series). This may be based on attempting and failing to find a family for the reference time series a threshold number of times.

Anomaly detection tool 1316 can then select a member of each family (e.g., a random member). Using the set of selected time series from the families, anomaly detection tool 1316 may repeat the aforementioned process described for the initial set of time series. This can result in new sets of families. Anomaly detection tool 1316 then merges the new family of each time series with the previously generated family of the time series. Anomaly detection tool 1316 may repeat the selection family members, generation of new families, and merging of families, any number of times until one or more ending conditions are satisfied. An example of an ending condition is when each family with at least two members has greater than a threshold number of members, and when anomaly detection tool 1316 has attempted and failed to find family members for each remaining time series a threshold number of times. The predictive models from each family may then be used for anomaly detection associated with their corresponding members.

3.3 Anomaly Detection Using Predictive Models

The predictive model(s) for each time series can be used to detect anomalies in values associated with the time series. Many approaches are available for anomaly detection using predicted values from the predictive models and actual values associated with the multiple time series. In one approach, the anomaly detection tool determines the median absolute deviation (MAD) from the predicted and actual values over a moving window of time. An anomaly may be detected based on the MAD exceeding a threshold value (e.g., falling outside of a range of values). The threshold may be a multiple 'w' of the MAD, such that the threshold is w*MAD.

Some approaches to anomaly detection are based on determining and comparing characteristics of values of the time series being predicted, the predicted values of the time series, and/or the time series upon which the predicted value are based. As one example, an anomaly may be detected, at least in part, based on determining turbulence of the values in the various time series. For example, anomaly detection tool 1316 could determine a turbulence of values in the predicted time series, which is compared to the actual turbulence of values in the time series.

As indicated above, any number of predictive models may be selected for anomaly detection (e.g., selected model 1416). Multiple predictive models can be used in various ways for the anomaly detection. For example, predictions from one or more of the models may be combined using some function (e.g., mean or max) and the combined values may be used for anomaly detection. For example, the combined values could be analyzed for anomalies therein, be used to analyze a time series for anomalies (e.g., one of the multiple models or another model), used to validate anomaly detection, or for other purposes. In some cases, predictions from at least one predictive model are used to validate predictions from one or more other predictive models. This could be used, for example, to detect concept drift in a predictive model.

There are many potential approaches for determining whether a residual(s) is sufficiently large to consider it an anomaly. Any combination of input parameters, user roles, configuration settings, residuals of other models around the same time, or temporal properties of the residual could be employed (e.g., take the local integral to consider intensity and duration). With respect to user roles, for example, some user roles in the system could be associated with higher thresholds than others for anomaly detection. As an example, an information technology Ops analyst may be tasked with reviewing alerts and may want a lower threshold than another role, such as a boss or manager, who may use a higher threshold so as to be notified of more severe incidents. These thresholds may be saved in association with the user roles and used for anomaly detection associated with a corresponding user role. Further, a user could provide an input parameter or configuration file setting various anomaly detection parameters, such as detection thresholds.

The anomaly detection tool may cause transmission of an indication of an anomaly detected using the selected predictive model (e.g., to a user and/or user device). For example, the anomaly detection tool can cause the indication to be automatically transmitted in response to detecting one or more anomalies (e.g., as an alert). The indication may take a variety of forms and many indications may be caused to be transmitted for a particular anomaly or particular anomalies. For example, an indication may be transmitted as part of an email, push notification, phone message, or display screen. As another example, an indication could be stored, retained, and/or analyzed to trigger actions such as retaining and/or generating of predictive models.

Figure 15:
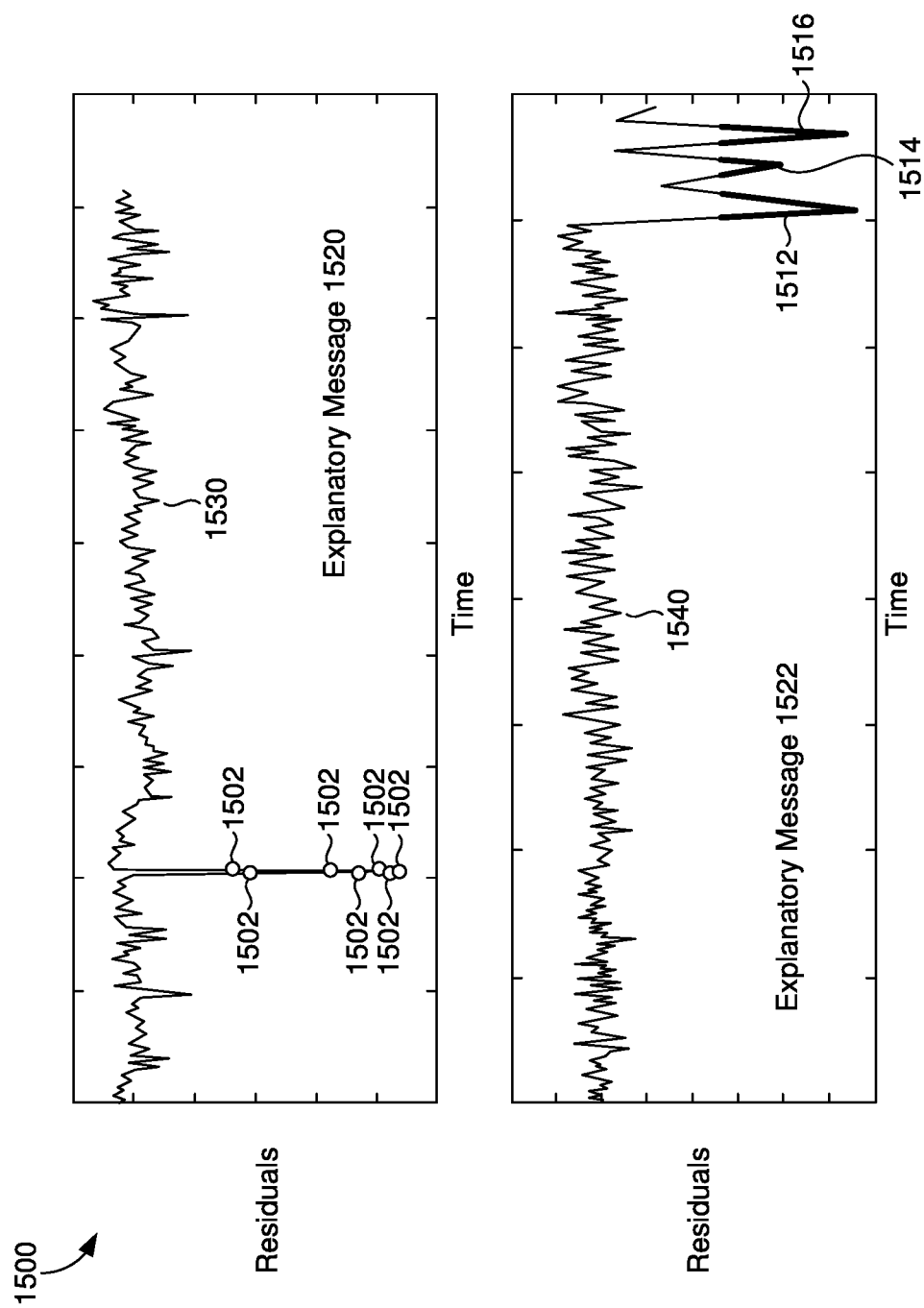
FIG. 15. illustrates a display including examples of indications of anomalies in accordance with disclosed embodiments.

FIG. 15. illustrates a display including examples of indications of anomalies, in accordance with embodiments of the present disclosure. Display 1500 may be provided for presentation on a user device, such as a client device (e.g., client device 1304). For example, anomaly detection tool 1316 can cause display 1500 to be presented on the user device. Display 1500 includes a graphical display of time series 1530 and time series 1540 from which anomaly detection tool 1316 has detected anomalies.

Display 1500 includes indications 1502 of anomalies detected by anomaly detection tool 1316 using a selected predictive model, such as selected model 1416. In this example, each indication corresponds to a detected anomalous value. The detected anomalous value is indicated on the graphical display of time series 1530 (e.g., at its relative position in the time series). Display 1500 also includes indications 1512, 1514, and 1516, which each correspond to multiple detected anomalous values. The detected anomalous values are indicated on the graphical display of time series 1530.

Also included is explanatory message (e.g., a verbal explanation such as text as a string and/or one or more sentences) generated based on time series 1530 and explanatory message 1522 generated based on time series 1540. Each explanatory message may indicate the expected or predicted relationship between the time series used for the anomaly detection. For example, an explanatory message could indicate there was an expected cohesive, anti-correlated, or time-shifted relationship between the time series captured by the predictive model. The explanatory message may also indicate other expected characteristics, such as the magnitude of the expected relationship, turbulence, and the like. The expected behavior may correspond to an observed characteristic determined from the multiple time series. An anomaly may optionally be detected based on the observed characteristic. Further, the observed characteristic or relationship may be presented to in the explanatory message (e.g., with the expected characteristic). An explanatory message may be included in a dashboard panel, a new event, or other knowledge object of the system.

As an example, a message could read "Normally metric A is X times metric B, but it was observed as Y times metric B," where X is a number representing the predicted characteristic and Y is a number representing the observed characteristic. Another example includes "Normally metric A is time-shifted by metrics B and C by X hours, but it was observed as being time-shifted by Y hours." Further examples include "The usual anti-correlated relationship between metrics A and B have been violated." It should be appreciated that many different variations are possible. Further, predicted characteristics are generally determined using the predictive model(s) used for anomaly detection (e.g., corresponding to parameters of the prediction function).

It is noted that selected predictive models (e.g., selected model 1416) can be used and selected for many purposes, in addition to or instead of for anomaly detection. As an example, one or more predictive models can be used for imputation of missing values in a time series. Values may be missing or inaccurate in a time series based on network or service interruptions, system crashes, or broken, disabled, or malfunctioning sensors or other computing components used to generate the time series. Predicted values from one or more predictive models can be used to validate and/or modify (e.g., change values of or add values to) the time series and/or event stream corresponding to the time series.

In some implementations, triaging is applied to at least one detected anomaly to determine whether the at least one anomaly is a false positive or negative. For example, based on the at least one anomaly being detected, further actions and determinations may be performed in order to validate the anomaly. If an anomaly is validated, an alert may be transmitted or other remedial action(s) may be performed. However, if the anomaly is invalidated, the remedial action may not be performed. As an example, assume an anomaly indicates a sensor reported a temperature of 500 degrees C. This could mean there is a fire and a fire alarm or other device should be triggered. However, this could also mean there was an error in the reporting. Using triaging, the anomaly could be transmitted to an automated system which uses a camera to determine whether to triggering a fire alarm, a maintenance ticket for the sensor, or take no remedial action.

As further examples, predictive errors (e.g., residuals) could be used as time series and incorporated into visualizations, such as dashboards, examples of which have been described above. This could allow for observation of the general quality of predictive models and/or a view of system behavior.

In some cases, one or more predictive models could be generated and selected from using methods described above, for each data center of a plurality of data centers using source data from the corresponding data sources (e.g., to predict the same metric or time series based on the data available at the data center). The resultant predictions from each data center could be combined and one or more predictive models could be generated from the combined predictions (e.g., in a time series) and selected from using methods described above to model inter-data center relationships.

Predictive models may also be utilized for forecasting the impact of changes to one of more time series on one or more other time series. For example, assume a predictive model captures the relationship between a CPU load metric and a network traffic metric. By modifying the network traffic (e.g., increasing the traffic by 10%), the impact of the modification can be forecasted for the CPU load. Using a forecasted time series, one or more actions could be automatically taken, such as allocating, modifying, configuring, or adjusting system resources or services corresponding to the metrics based on the forecasted time series.

3.4 Illustrative Examples

Figure 17:
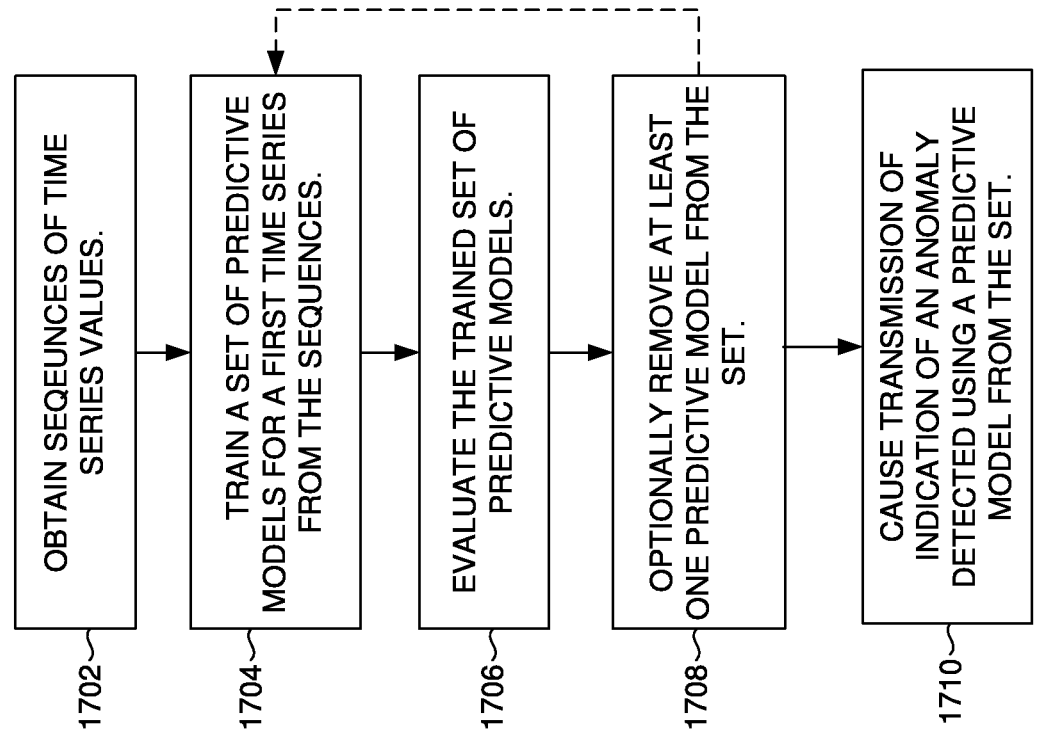
FIG. 17 is a flow diagram depicting an illustrative method in accordance with disclosed embodiments.
Figure 16:
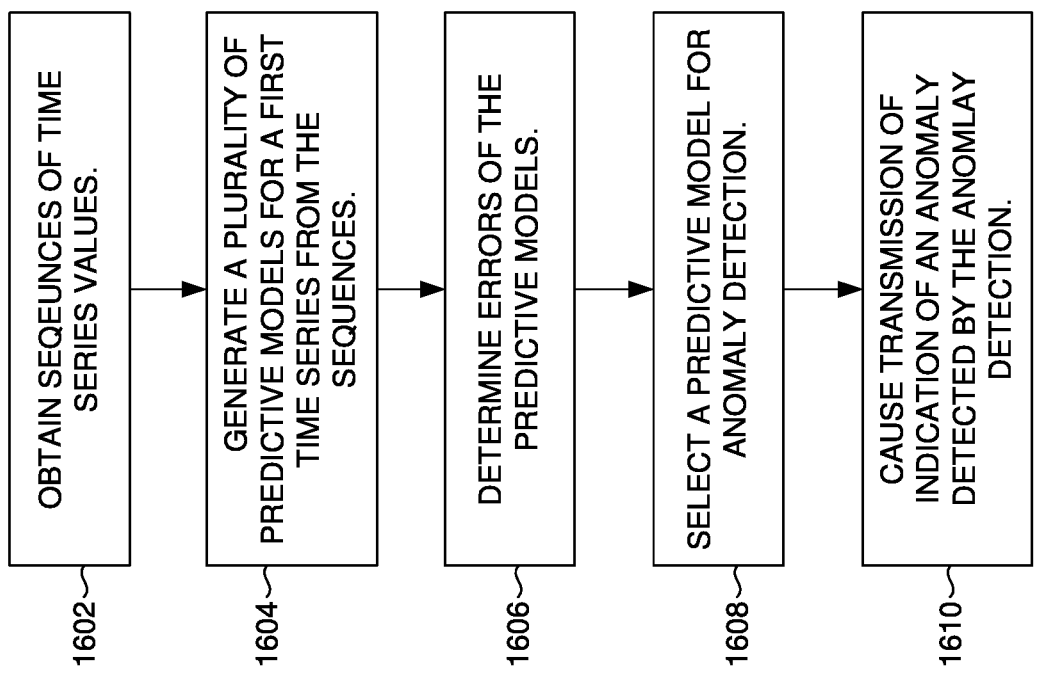
FIG. 16 is a flow diagram depicting an illustrative method in accordance with disclosed embodiments.

FIGS. 16-18 illustrate various methods in accordance with embodiments of the present disclosure. Although the methods are provided as separate methods, aspects thereof may be combined into a single method or combination of methods. As can be appreciated, additional or alternative steps may also be included in different embodiments.

With initial reference to FIG. 16, FIG. 16 illustrates method 1600 in accordance with embodiments of the present application. Such a method may be performed, for example, at an anomaly detection tool, such as anomaly detection tool 1316 of FIG. 13. At block 1602, sequences of time series values are obtained. For example, anomaly detection tool 1316 may obtain sequences of time series values from data store 1314 and/or indexer 1312. The time series values may correspond to events and may be determined from machine data. Further, each sequence can correspond to a respective time series. The sequences may or may not correspond to one or more streams of source data.

At block 1604, a plurality of predictive models is generated for a first time series from the sequences. For example, anomaly detection tool 1316 can generate predictive models 1410 for a first time series from the sequences of time series values. Each predictive model is configured to generate predicted values (e.g., corresponding to predicted time series 1432) associated with the first time series (e.g., time series 1430) using values of or associated with at least one other second time series (e.g., time series 1420 and/or 1422).

At block 1606, errors of the predictive models are determined. For example, anomaly detection tool 1316 can for each of the plurality of predictive models, determine an error between the corresponding predicted values and values associated with the first time series. In some cases, the error can correspond to residuals (e.g., residual time series 1434) between the predicted values and the values associated with the first time series.

At block 1608, a predictive model is selected for anomaly detection. For example, anomaly detection tool 1316 can select at least one predictive model (e.g., selected model 1416) for anomaly detection based on the determined error of the predictive model. In some embodiments, this may include iterative training, evaluating, and filtering of predictive models.

At block 1610, transmission is caused of an indication of an anomaly detected by the anomaly detection. For example, anomaly detection tool 1316 can cause transmission of an indication of an anomaly detected using the selected predictive model. In some cases, the indication may correspond to indications 1502, 1512, 1514, or 1516 of FIG. 15.

Turning now to FIG. 17, FIG. 17 illustrates method 1700 in accordance with embodiments of the present application. Such a method may be performed, for example, at an anomaly detection tool, such as anomaly detection tool 1316 of FIG. 13. At block 1702, sequences of time series values are obtained. For example, anomaly detection tool 1316 may obtain sequences of time series values from data store 1314 and/or indexer 1312. The time series values may correspond to events and may be determined from machine data. Further, each sequence can correspond to a respective time series. The sequences may or may not correspond to one or more streams of source data.

At block 1704, a set of predictive models for a first timer series is trained from the sequences. For example, anomaly detection tool 1316 may train each of predictive models 1412 to predict values of time series 1430 using values associated with at least one other time series.

At block 1706, the trained set of predictive models is evaluated. For example, anomaly detection tool 1316 may evaluate predicted values generated using predictive models 1412 with respect to actual values of time series 1430. This may include determining at least one residual for each predictive model, such as residual time series 1434.

At block 1708, at least one predictive model is removed from the set. For example, anomaly detection tool 1316 may remove, or filter out at least one of predictive models 1410 based on the evaluation. Various examples of criteria for narrowing the set of predictive models have been described above. Optionally, block 1704 and/or block 1706 may be repeated with the reduced set of predictive models (e.g., predictive models 1412 followed by predictive models 1414) unless an ending condition is satisfied. The ending condition could be based on a variety of possible factors including a number of iterations or repetitions performed, an amount of error in one or more of the models, the model type of one or more remaining models, and more.

Based on the evaluation of the predictive models, at least one of the remaining models in the set (e.g., one or more predictive models) is used for anomaly detection. This set may include selected model 1416. As shown, removing a predictive model from the set may in some cases be optional at any given iteration. For example, in some iterations, no model may be removed from the set. Further, a model may be selected for anomaly detection at any time in method 1700 and in any iteration. It is also noted the various evaluation and removal criteria can change in different instances of blocks 1706 and 1708.

At block 1710, transmission is caused of an indication of an anomaly detected by the anomaly detection. For example, anomaly detection tool 1316 can cause transmission of an indication of an anomaly detected using the selected predictive model. In some cases, the indication may correspond to indications 1502, 1512, 1514, or 1516 of FIG. 15.

Turning now to FIG. 18, FIG. 18 illustrates method 1800 in accordance with embodiments of the present application. Such a method may be performed, for example, at an anomaly detection tool, such as anomaly detection tool 1316 of FIG. 13. At block 1802, a set of time series are identified for anomaly detection. For example, anomaly detection tool 1316 may identify the set of time series based on a user selection associated with the time series and/or a user identification or other user interaction associated with the time series.

At block 1804, the set of time series are clustered. For example, based on the identifying of the set, anomaly detection tool 1316 may cluster the set of time series, resulting in a set of clusters each including at least one of the time series.

At block 1806, a representative time series is determined for a cluster. For example, for each cluster anomaly detection tool 1316 may determine a representative time series. A representative time series for a cluster may correspond to any number of the time series in a cluster. For example, anomaly detection tool 1316 may use a time series of the cluster as the representative time series, or use a time series corresponding to an aggregation of multiple ones of the time series.

At block 1808, a predictive model is determined for the representative time series. For example, for each cluster, anomaly detection tool 1316 may determine a predictive model configured to predict values associated with the corresponding representative time series using values associated with at least one time series of another cluster (e.g., corresponding to a representative time series of another cluster and/or a time series of the cluster). By way of example, at least one of the predictive models may be determined in accordance with the description of FIGS. 14A and 14B.

At block 1810, anomaly detection is performed using the predictive model. For example, anomaly detection tool 1316 may perform anomaly detection on a time series associated with the cluster. This could be performed on values associated with the representative time series, and/or the multiple time series of the set of time series. Anomaly detection tool 1316 may in some cases perform anomaly detection which covers each time series in the set of time series. Any number of predictive models or combinations thereof may be employed. Anomaly detection tool 1316 may cause transmission of an indicator based on detecting one or more anomalies associated with the set of time series. It is noted indicators as used herein, need not correspond to information presented or displayed to a user. For example, an indicator may trigger some action by one or more computing devices, such as a corrective, remedial, or security-related action or function.

3.5 Illustrative Hardware System

The systems and methods described above may be implemented in a number of ways. One such implementation includes computer devices having various electronic components. For example, components of the system in FIG. 13 may, individually or collectively, be implemented with devices having one or more Application Specific Integrated Circuits (ASICs) adapted to perform some or all of the applicable functions in hardware. Alternatively, the functions may be performed by one or more other processing units (or cores), on one or more integrated circuits or processors in programmed computers. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific computer processors.

Figure 19:
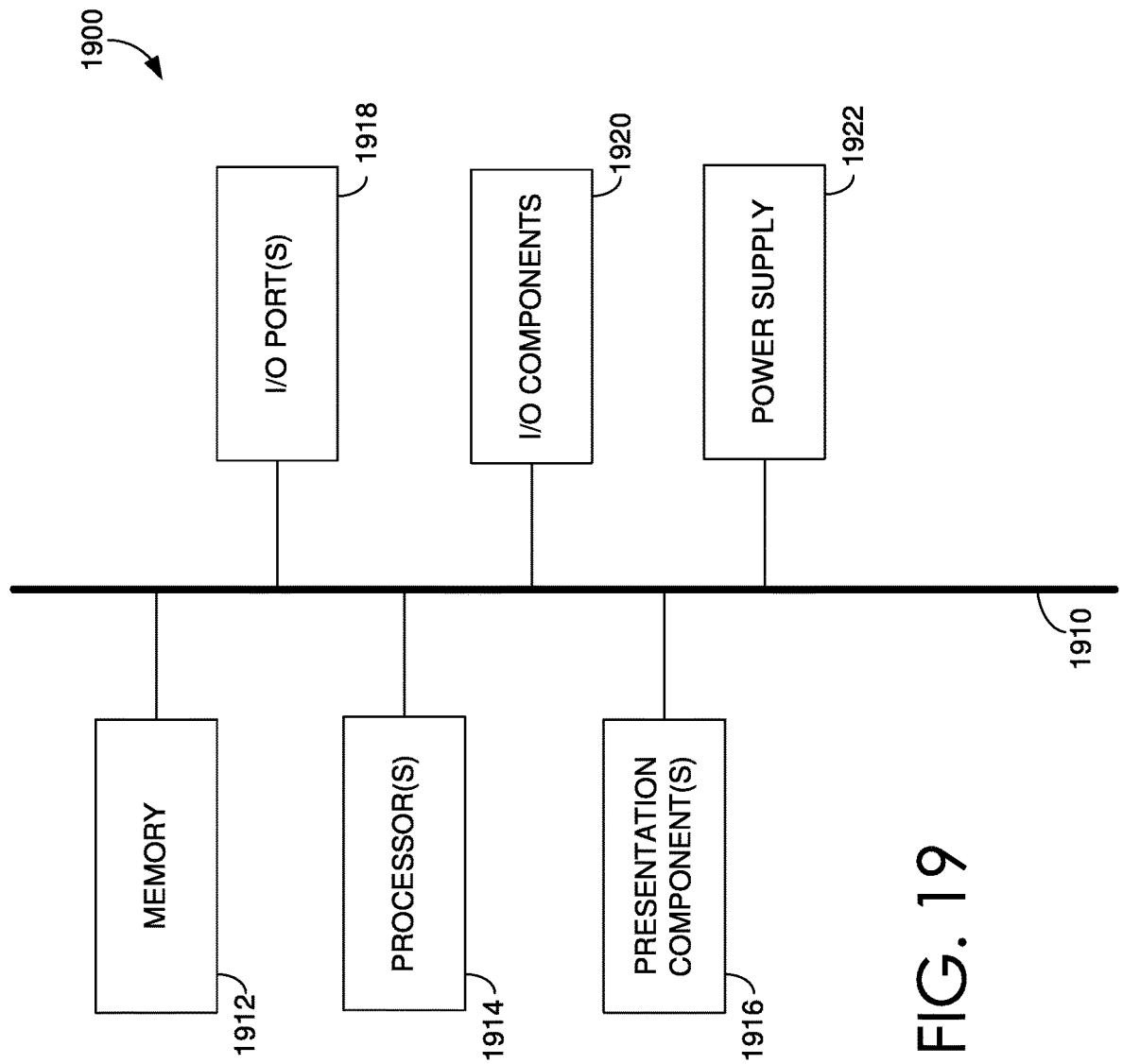
FIG. 19 is a block diagram of an example computing device in which embodiments of the present disclosure may be employed.

An example operating environment in which embodiments of the present disclosure may be implemented is described below in order to provide a general context for various aspects of the present disclosure. Referring to FIG. 19, an illustrative operating environment for implementing embodiments of the present disclosure is shown and designated generally as computing device 1900. Computing device 1900 is but one example of a suitable operating environment and is not intended to suggest any limitation as to the scope of use or functionality of the invention. Neither should the computing device 1900 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialized computing devices, etc. The invention may also be practiced in distributed computing environments where tasks are performed by remote-processing devices that are linked through a communications network.

With reference to FIG. 19, computing device 1900 includes a bus 1910 that directly or indirectly couples the following devices: memory 1912, one or more processors 1914, one or more presentation components 1916, input/output (I/O) ports 1918, I/O components 1920, and an illustrative power supply 1922. Bus 1910 represents what may be one or more busses (such as, for example, an address bus, data bus, or combination thereof). Although depicted in FIG. 19, for the sake of clarity, as delineated boxes that depict groups of devices without overlap between these groups of devices, in reality, this delineation is not so clear cut and a device may well fall within multiple ones of these depicted boxes. For example, one may consider a display to be one of the one or more presentation components 1916 while also being one of the I/O components 1920. As another example, processors have memory integrated therewith in the form of cache; however, there is no overlap depicted between the one or more processors 1914 and the memory 1912. A person of skill in the art will readily recognize that such is the nature of the art, and it is reiterated that the diagram of FIG. 19 merely depicts an illustrative computing device that can be used in connection with one or more embodiments of the present disclosure. It should also be noticed that distinction is not made between such categories as "workstation," "server," "laptop," "handheld device," etc., as all such devices are contemplated to be within the scope of computing device 1900 of FIG. 19 and any other reference to "computing device," unless the context clearly indicates otherwise.

Computing device 1900 typically includes a variety of computer-readable media. Computer-readable media can be any available media that can be accessed by computing device 1900 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 2400. Computer storage media does not comprise signals per se, such as, for example, a carrier wave. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1912 includes computer storage media in the form of volatile and/or nonvolatile memory. The memory may be removable, non-removable, or a combination thereof. Typical hardware devices may include, for example, solid-state memory, hard drives, optical-disc drives, etc. Computing device 1900 includes one or more processors 1914 that read data from various entities such as memory 1912 or I/O components 1920. Presentation component(s) 1916 present data indications to a user or other device. Illustrative presentation components include a display device, speaker, printing component, vibrating component, etc.

I/O ports 1918 allow computing device 1900 to be logically coupled to other devices including I/O components 1920, some of which may be built in. Illustrative components include a keyboard, mouse, microphone, joystick, game pad, satellite dish, scanner, printer, wireless device, etc. The I/O components 1920 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described elsewhere herein) associated with a display of the computing device 1900. The computing device 1900 may be equipped with depth cameras, such as stereoscopic camera systems, infrared camera systems, RGB camera systems, touchscreen technology, and combinations of these, for gesture detection and recognition. Additionally, the computing device 1900 may be equipped with accelerometers or gyroscopes that enable detection of motion.

As can be understood, implementations of the present disclosure provide for various approaches to data processing. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method comprising:
   obtaining sequences of time series values determined from raw machine data, each sequence corresponding to a respective time series, wherein the raw machine data is produced by one or more components within an information technology or security environment and reflects activity within the information technology or security environment;

identifying a predictive model for a first time series based on the sequences of time series values, the predictive model trained over a training period to generate predicted values associated with the first time series using time series values corresponding to a second time series;

evaluating one or more characteristics of the predictive model; and selecting the predictive model for anomaly detection based on the evaluating of the one or more characteristics.

2. The method of claim 1, further comprising applying the selected predictive model to subsequently received time series values of the second time series to detect an anomaly.

3. The method of claim 1, wherein the evaluating comprises determining an error between the predicted values and values associated with the first time series, wherein the selecting of the predictive model is based on the error of the predictive model.

4. The method of claim 1, wherein the one or more characteristics correspond to residuals between the predicted values of the predictive model and time series values associated with the first time series.

5. The method of claim 1 comprising:

further training the predictive model over a subsequent training period based on the evaluating of the one or more characteristics; and further evaluating the predictive model based on the further training, wherein the predictive model is selected for the anomaly detection based on the further evaluating.

6. The method of claim 1 comprising:

training the predictive model using first portions of the sequences of time series values corresponding to the training period; and analyzing second portions of the sequences of time series values corresponding to a prediction period, wherein the one or more characteristics are based on the analyzed second portions.

7. The method of claim 1, further comprising clustering the sequences of time series values into a plurality of clusters, wherein the first time series corresponds to a representative time series of a first of the plurality of clusters and the second time series corresponds to at least one time series in a second cluster of the plurality of clusters.

8. The method of claim 1, wherein the obtaining of the sequences of time series values is responsive to a user interaction associated with the sequences of the series values.

9. The method of claim 1, wherein the sequences of time series values correspond to at least one of performance metrics or security-related metrics.

10. The method of claim 1, wherein the predictive model comprises one or more of a polynomial model, a neural network, or a decision tree model.

11. The method of claim 1, wherein the obtaining of the sequences of time series values is from one or more streams of time series data.

12. The method of claim 1, wherein the one or more characteristics are based on a first explanatory value associated with a model type of the predictive model.

13. The method of claim 1, wherein the values of the second time series correspond to events, each event comprising a time stamp and a portion of raw data.

14. The method of claim 1, wherein each data point of the second time series is associated with a respective time stamp of a respective event.

15. The method of claim 1, comprising generating the time series values from event data using a late-binding schema.

16. The method of claim 1, wherein the predicted values are associated with later times than the values of the second time series used to generate the predictive model.

17. The method of claim 1, further comprising causing an explanatory message to be presented based on the anomaly detection, the explanatory message indicating a predicted relationship corresponding to the predictive model and an observed relationship associated with an anomaly.

18. The method of claim 1, wherein the selecting is of multiple models including the predictive model based on the evaluating of the one or more characteristics, and the anomaly is detected using the multiple models.

19. One or more non-transitory computer-readable storage media having instructions stored thereon, wherein the instructions, when executed by one or more processors, cause the one or more processors to perform a computer-implemented method comprising:

obtaining sequences of time series values determined from raw machine data, each sequence corresponding to a respective time series, wherein the raw machine data is produced by one or more components within an information technology or security environment and reflects activity within the information technology or security environment;

identifying a predictive model for a first time series based on the sequences of time series values, the predictive model trained over a training period to generate predicted values associated with the first time series using time series values corresponding to a second time series;

evaluating one or more characteristics of the predictive model; and selecting the predictive model for anomaly detection based on the evaluating of the one or more characteristics.

20. The one or more computer-readable storage media of claim 19, wherein the method further comprises applying the selected predictive model to subsequently received time series values of the second time series to detect an anomaly.

21. The one or more computer-readable storage media of claim 19, wherein the evaluating comprises determining an error between the predicted values and values associated with the first time series, wherein the selecting of the predictive model is based on the error of the predictive model.

22. The one or more computer-readable storage media of claim 19, wherein the one or more characteristics correspond to residuals between the predicted values of the predictive model and time series values associated with the first time series.

23. The one or more computer-readable storage media of claim 19, wherein the method further comprises:

further training the predictive model over a subsequent training period based on the evaluating of the one or more characteristics; and further evaluating the predictive model based on the further training, wherein the predictive model is selected for the anomaly detection based on the further evaluating.

24. The one or more computer-readable storage media of claim 19, wherein the method further comprises:

training the predictive model using first portions of the sequences of time series values corresponding to the training period; and analyzing second portions of the sequences of time series values corresponding to a prediction period, wherein the one or more characteristics are based on the analyzed second portions.

25. A computer-implemented system comprising:

one or more hardware processors;

one or more computer-readable storage media having instructions stored thereon, wherein the instructions, when executed by the one or more processors, cause the one or more processors to perform a method comprising:

obtaining sequences of time series values determined from raw machine data, each sequence corresponding to a respective time series, wherein the raw machine data is produced by one or more components within an information technology or security environment and reflects activity within the information technology or security environment;

identifying a predictive model for a first time series based on the sequences of time series values, the predictive model trained over a training period to generate predicted values associated with the first time series using time series values corresponding to a second time series;

evaluating one or more characteristics of the predictive model; and selecting the predictive model for anomaly detection based on the evaluating of the one or more characteristics.

26. The system of claim 25, wherein the method further comprises applying the selected predictive model to subsequently received time series values of the second time series to detect an anomaly.

27. The system of claim 25, wherein the evaluating comprises determining an error between the predicted values and values associated with the first time series, wherein the selecting of the predictive model is based on the error of the predictive model.

28. The system of claim 25, wherein the one or more characteristics correspond to residuals between the predicted values of the predictive model and time series values associated with the first time series.

29. The system of claim 25, wherein the method further comprises:

further training the predictive model over a subsequent training period based on the evaluating of the one or more characteristics; and further evaluating the predictive model based on the further training, wherein the predictive model is selected for the anomaly detection based on the further evaluating.

30. The system of claim 25, wherein the method further comprises:

training the predictive model using first portions of the sequences of time series values corresponding to the training period; and analyzing second portions of the sequences of time series values corresponding to a prediction period, wherein the one or more characteristics are based on the analyzed second portions.

\* \* \* \* \*